United States Patent
Ueno et al.

(10) Patent No.: US 6,276,131 B1
(45) Date of Patent: *Aug. 21, 2001

(54) APPARATUS FOR CONTROLLING INTERNAL COMBUSTION ENGINE

(75) Inventors: Masaki Ueno; Yuji Yasui; Yoshihisa Iwaki; Tadashi Sato; Shusuke Akazaki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,404

(22) Filed: Dec. 17, 1999

(30) Foreign Application Priority Data

Dec. 17, 1998 (JP) .................................................. 10-359759

(51) Int. Cl.[7] ..................................................... F01N 3/00
(52) U.S. Cl. ................................ 60/285; 60/274; 60/277; 123/339.11
(58) Field of Search ............................. 60/285, 274, 277, 60/286; 123/406.44, 406.45, 683, 339.11

(56) References Cited

U.S. PATENT DOCUMENTS

| 5,462,039 | * | 10/1995 | Mamiya et al. | 123/686 |
| 5,535,586 | * | 7/1996 | Ohta et al. | 60/285 |
| 5,661,974 | * | 9/1997 | Kitamura et al. | 60/285 |
| 5,784,880 | * | 7/1998 | Toshiro et al. | 60/277 |
| 5,894,724 | * | 4/1999 | Minowa et al. | 60/274 |
| 5,950,419 | * | 9/1999 | Nishimura et al. | 60/274 |

FOREIGN PATENT DOCUMENTS 10-299631  11/1998 (JP) .

OTHER PUBLICATIONS

Serial No.: 09/063,732; filed: Apr. 24, 1998; By: Yuji Yasui et al; For Control System for Controlling Internal Combustion Engine

* cited by examiner

Primary Examiner—Thomas Denion
Assistant Examiner—Binh Tran
(74) Attorney, Agent, or Firm—Arent Fox Kintner Plotkin & Kahn, PLLC

(57) ABSTRACT

While the amount of intake air introduced into an internal combustion engine is being increased by an intake air quantity control unit, an ignition timing control unit manipulates the ignition timing of the internal combustion engine to converge the rotational speed of the internal combustion engine to a target rotational speed according to a feedback control process (PI control process). The ignition timing control unit has a function to vary the feedback gain of the feedback control process depending on the ignition timing, such that the feedback gain is smaller as the ignition timing being manipulated is more retarded.

8 Claims, 14 Drawing Sheets

THO CALCULATING PROCESS (STEP3-5)

RETARDED ANGLE CORRECTIVE QUANTITY CALCULATING PROCESS (STEP10-3)

APPARATUS FOR CONTROLLING INTERNAL COMBUSTION ENGINE

BACKGROUND OF THE INVENTION

1. Field of the Invention

The present invention relates to an apparatus for controlling an internal combustion engine which emits exhaust gases through a catalytic converter.

2. Description of the Related Art

Catalytic converters such as three-way catalytic converters are disposed in the exhaust systems of internal combustion engines for purifying exhaust gases emitted from the internal combustion engines. Generally, such a catalytic converter cannot maintain a desired ability to purify exhaust gases unless its temperature rises to a level high enough to activate the catalytic converter. It is, therefore, important for the catalytic converter to achieve a desired level of exhaust gas purification immediately after the internal combustion engine has started to operate when the temperature of the catalytic converter is comparatively low.

The applicant of the present application has proposed a technology for purifying exhaust gases when the catalytic converter has a relatively low temperature, as disclosed in Japanese laid-open patent publication No. 10-299631 and U.S. patent application Ser. No. 09/063732. The proposed exhaust gas purifying system will be described below.

When an internal combustion engine idles after it has started to operate, the amount of intake air introduced into the internal combustion engine is made greater than when the internal combustion engine idles normally, e.g., when the internal combustion engine idles after an automobile propelled by the internal combustion engine has traveled. Furthermore, after the amount of intake air has started increasing, a command value for the ignition timing of the internal combustion engine is generated according to a feedback control process (specifically, a PI (proportional plus integral) control process) in order to converge the rotational speed (actual rotational speed) of the internal combustion engine, which tends to increase due to the increasing amount of intake air, toward a certain target rotational speed. The actual ignition timing of the internal combustion engine is then controlled based on the generated command value, so that the ignition timing will be more retarded than normal.

When the amount of intake air is increased and the ignition timing is retarded in the manner described above, the exhaust gases emitted by the internal combustion engine upon combustion of the air-fuel mixture have a greater amount of heat, and hence the catalytic converter heated by the exhaust gases is activated quickly. As a result, the catalytic converter is capable of achieving a desired purification ability quickly after the internal combustion engine has started to operate.

According to the above proposed technology, when the rotational speed of the internal combustion engine, which tends to increase due to the increasing amount of intake air, is controlled so as to converge to the target rotational speed according to the feedback control process (hereinafter referred to as an "ignition timing control rotational speed F/B control process"), the ignition timing is controlled so as to be retarded while the rotational speed of the internal combustion engine is being maintained stably. Therefore, the amount of intake air can be increased and the ignition timing can be controlled independently of each other. In addition, the system for controlling the amount of intake air and the ignition timing can easily be constructed and simplified.

The feedback gain of the ignition timing control rotational speed F/B control process, i.e., the rate of change of the command value for the ignition timing to the difference between the actual and target rotational speeds of the internal combustion engine (hereinafter referred to as a "rotational speed difference"), has heretofore been set to a feedback gain fixed with respect to the ignition timing, which has been determined by way of experimentation and simulation. Such feedback gain determination is equivalent in the PI control process to the determination of coefficient parameters relative to proportional and integral terms (gains of proportional and integral terms) as fixed values with respect to the ignition timing.

The inventors of the present application have found as a result of further studies that the rotational speed of the internal combustion engine may possibly become unstable with respect to the target rotational speed according to the conventional technology.

Various studies made by the inventors of the present application have revealed that the rate of a change of the rotational speed (actual speed) of the internal combustion engine to a change of the ignition timing tends to be greater as the ignition timing is more retarded. When a command value for the ignition timing is generated to converge the rotational speed of the internal combustion engine to the target rotational speed according to the ignition timing control rotational speed F/B control process, the command value is affected various operating conditions of the internal combustion engine. Consequently, the command value for the ignition timing and the actual ignition timing controlled depending on the command value often become relatively largely retarded.

When the ignition timing of the internal combustion engine is relatively largely retarded, a change of the command value for the ignition timing generated depending on the rotational speed difference becomes excessively large, meaning that the feedback gain of the ignition timing control rotational speed F/B control process is excessively large. As a result, the actual rotational speed of the internal combustion engine excessively changes to the target rotational speed, and the actual rotational speed becomes unstable (the actual rotational speed fluctuates in an oscillatory fashion with respect to the target rotational speed).

One solution would be to set the feedback gain of the ignition timing control rotational speed F/B control process to a relatively small gain. With such a relatively small feedback gain, however, insofar as the ignition timing has not been largely retarded, the quick response of the control process for converging the rotational speed of the internal combustion engine to the target rotational speed according to the ignition timing control rotational speed F/B control process is reduced.

SUMMARY OF THE INVENTION

It is therefore an object of the present invention to provide an apparatus for controlling the ignition timing of an internal combustion engine according to a feedback control process to increase the amount of intake air introduced into the internal combustion engine and converge the rotational speed of the internal combustion engine to a target rotational speed while the internal combustion engine is idling after it has started to operate, for the purpose of quickly activating a catalytic converter coupled to the internal combustion engine, the apparatus being capable of achieving the stability and quick response of a control process for converging the rotational speed of the internal combustion engine to the target rotational speed irrespective of how the ignition timing is controlled.

In order to accomplish the above object, there is provided in accordance with the present invention an apparatus for controlling an internal combustion engine which emits exhaust gases through a catalytic converter, comprising intake air quantity control means for increasing an amount of intake air introduced into the internal combustion engine when the internal combustion engine is idling after the internal combustion engine starts to operate, to a level greater than when the internal combustion engine is idling normally, ignition timing control means for generating a command value for ignition timing of the internal combustion engine according to a feedback control process in order to converge a rotational speed of the internal combustion engine to a predetermined target rotational speed after the amount of intake air introduced into the internal combustion engine starts being increased, and manipulating the ignition timing of the internal combustion engine based on the generated command value for ignition timing, and means for variably establishing a feedback gain of the feedback control process depending on the ignition timing manipulated by the ignition timing control means.

With the above arrangement, when the ignition timing control means manipulates the ignition timing of the internal combustion engine while the amount of intake air introduced into the internal combustion engine is being increased by the intake air quantity control means, the rotational speed (actual rotational speed) of the internal combustion engine, which tends to increase due to the increased amount of intake air, is feedback-controlled at a predetermined target rotational speed suitable for an idling operation of the internal combustion engine. The feedback gain of the feedback control process, i.e., the rate of change of the command value for the ignition timing to the difference between the actual rotational speed of the internal combustion engine and the target rotational speed, is variably established depending on the ignition timing manipulated by the ignition timing control means. Thus, the command value for the ignition timing for converging the rotational speed of the internal combustion engine to the target rotational speed can be made suitable for the manipulation of the ignition timing. As a result, the stability and quick response of the control process for converging the rotational speed of the internal combustion engine to the target rotational speed can be achieved irrespective of the manipulation of the ignition timing.

Specifically, the means for variably establishing a feedback gain comprises means for establishing the feedback gain such that the feedback gain is smaller as the ignition timing is more retarded.

As the ignition timing being manipulated is more retarded, the rate of a change of the rotational speed of the internal combustion engine to a change in the ignition timing tends to be greater. Therefore, the feedback gain is reduced in a situation where the ignition timing is manipulated into a relatively largely retarded value. In such a situation where the ignition timing is manipulated into a relatively largely retarded value, when the difference between the rotational speed (actual rotational speed) of the internal combustion engine and the target rotational speed changes, a change in the command value for the ignition timing generated by the ignition timing control means according to the feedback control process is made small. As a result, the rotational speed of the internal combustion engine can smoothly be converged to the target rotational speed, rather than being abruptly changed to the target rotational speed. The stability of the control process for converging the rotational speed of the internal combustion engine to the target rotational speed can thus be achieved.

Conversely, in a situation where the ignition timing being manipulated is advanced, the feedback gain is relatively large. Therefore, when the difference between the rotational speed (actual rotational speed) of the internal combustion engine and the target rotational speed changes, a change in the command value for the ignition timing generated by the ignition timing control means according to the feedback control process becomes relatively large. As a result, the rotational speed of the internal combustion engine can quickly be converged to the target rotational speed, and hence the quick response of the control process for converging the rotational speed of the internal combustion engine to the target rotational speed can be achieved.

The feedback control process comprises a proportional plus integral (PI) control process, for example. The means for variably establishing a feedback gain comprises means for varying the value of at least one of a coefficient parameter of a proportional term which is proportional to the difference between an actual rotational speed of the internal combustion engine and the target rotational speed, and a coefficient parameter of an integral term proportional to an integral of the difference, for thereby variably establishing the feedback gain.

Specifically, if the feedback control process comprises a proportional plus integral (PI) control process, then one or both of the coefficient parameter of the proportional and integral terms are varied depending on the ignition timing which is being manipulated. The feedback gain can thus variably be set up depending on the ignition timing.

The feedback control process may comprise a proportional plug integral plus derivative (PID) control process which takes into account a derivative term as well as the proportional and integral terms. Therefore, the proportional plus integral control process according to the present invention covers such a proportional plug integral plus derivative control process.

The apparatus should preferably further comprises target-rotational-speed setting means for setting the target rotational speed by varying the target rotational speed from a preset rotational speed to an idling rotational speed after the rotational speed of the internal combustion engine has reached the preset rotational speed which is higher than the idling rotational speed after the amount of intake air introduced into the internal combustion engine has started being increased by the intake air quantity control means.

With the above arrangement, after the rotational speed of the internal combustion engine has reached the preset rotational speed which is higher than the idling rotational speed, i.e., the idling speed at which the rotational speed of the internal combustion engine should finally be maintained, the target rotational speed is established so as to vary from the preset rotational speed to the idling rotational speed, and finally set to the idling rotational speed. The command value for the ignition timing to converge the rotational speed of the internal combustion engine to the target rotational speed thus established is sequentially generated according to the feedback control process. Thus, the ignition timing is manipulated based on the command value for the ignition timing generated according to the feedback control process, such that after the rotational speed of the internal combustion engine has increased to the preset rotational speed which is higher than the idling rotational speed due to the increased amount of intake air, the rotational speed of the internal combustion engine is kept higher than the idling rotational speed, which is the final target rotational speed, for a certain period of time, and is finally converged to the idling rotational speed. In this manner, the rotational speed of the internal combustion engine is prevented from dropping sharply in an initial period of the feedback control process due to the manipulation of the ignition timing, and is also prevented from falling largely from the idling rotational speed, so that the operation of the internal combustion engine is prevented from becoming unstable.

The intake air quantity control means comprises means for determining an increase in the amount of intake air introduced into the internal combustion engine while the internal combustion engine is idling normally, depending on the temperature of the catalytic converter when the internal combustion engine starts to operate, according to a feed-forward control process, and manipulating the amount of intake air introduced into the internal combustion engine according to the determined increase.

If the temperature of the catalytic converter is relatively low at the start of the internal combustion engine, then a large amount of heat is required to increase the temperature of and activate the catalytic converter quickly. Conversely, if the temperature of the catalytic converter is relatively high at the start of the internal combustion engine, then the amount of heat required to increase the temperature of and activate the catalytic converter may be small. According to the present invention, therefore, the increase (which basically determines the amount of heat given to the catalytic converter) in the amount of intake air introduced into the internal combustion engine is determined according to the feed-forward control process depending on the temperature of the catalytic converter at least at the start of the internal combustion engine. It is thus possible to increase the temperature of and activate the catalytic converter quickly irrespective of the temperature of the catalytic converter at the start of the internal combustion engine.

For determining the increase in the amount of intake air depending on the temperature of the catalytic converter at least at the start of the internal combustion engine, the intake air quantity control means should preferably comprise means for determining the increase in order to gradually increase the increase with time immediately after the amount of intake air introduced into the internal combustion engine has started being increased.

Specifically, if the amount of intake air is quickly increased stepwise immediately after the start of the internal combustion engine, then the operation of the internal combustion engine tends to become unstable. However, since the increase in the amount of intake air is gradually increased according to the present invention, the operation of the internal combustion engine is prevented from becoming unstable.

Furthermore, the intake air quantity control means should preferably comprise means for determining the increase in order to gradually reduce the increase with time upon elapse of a predetermined time after the amount of intake air introduced into the internal combustion engine has started being increased.

Upon elapse of a certain period of time after the start of the internal combustion engine, even if the amount of intake air is constant, the friction of various components of the internal combustion engine is reduced as the internal combustion engine becomes warmer, and the rotational speed of the internal combustion engine tends to increase. According to the present invention, upon elapse of the predetermined time, the increase in the amount of intake air is gradually reduced to compensate for the increasing tendency of the rotational speed of the internal combustion engine due to the reduced friction, without having to retard the ignition timing more than necessary.

The intake air quantity control means preferably comprise means for correcting the increase so as to reduce the amount of intake air when the command value for the ignition timing generated by the ignition timing control means according to the feedback control process is more retarded than a predetermined threshold which is more retarded than the ignition timing within a predetermined allowable range for the ignition timing in which the internal combustion engine is capable of operating normally.

With the rotational speed of the internal combustion engine tending to increase with respect to the target rotational speed due to the reduction in the friction of various components of the internal combustion engine, when the command value for the ignition timing generated according to the feedback control process changes to a value more retarded than the threshold, i.e., to a largely retarded value, the intake air quantity control means corrects the increase in the amount of intake air so as to reduce the amount of intake air. Therefore, the increasing tendency of the rotational speed of the internal combustion engine is suppressed, preventing the command value for the ignition timing from becoming more retarded out of the allowable range. As a result, in a situation where the rotational speed of the internal combustion engine tends to increase with respect to the target rotational speed due to the reduction in the friction of various components of the internal combustion engine, the command value for the ignition timing is maintained within the allowable range, and the ignition timing can be manipulated based on the command value. Thus, the rotational speed of the internal combustion engine can stably be converged to the target rotational speed.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

An apparatus for controlling an internal combustion engine according to the present invention will be described below with reference to FIGS. 1 through 16.

Figure 1:
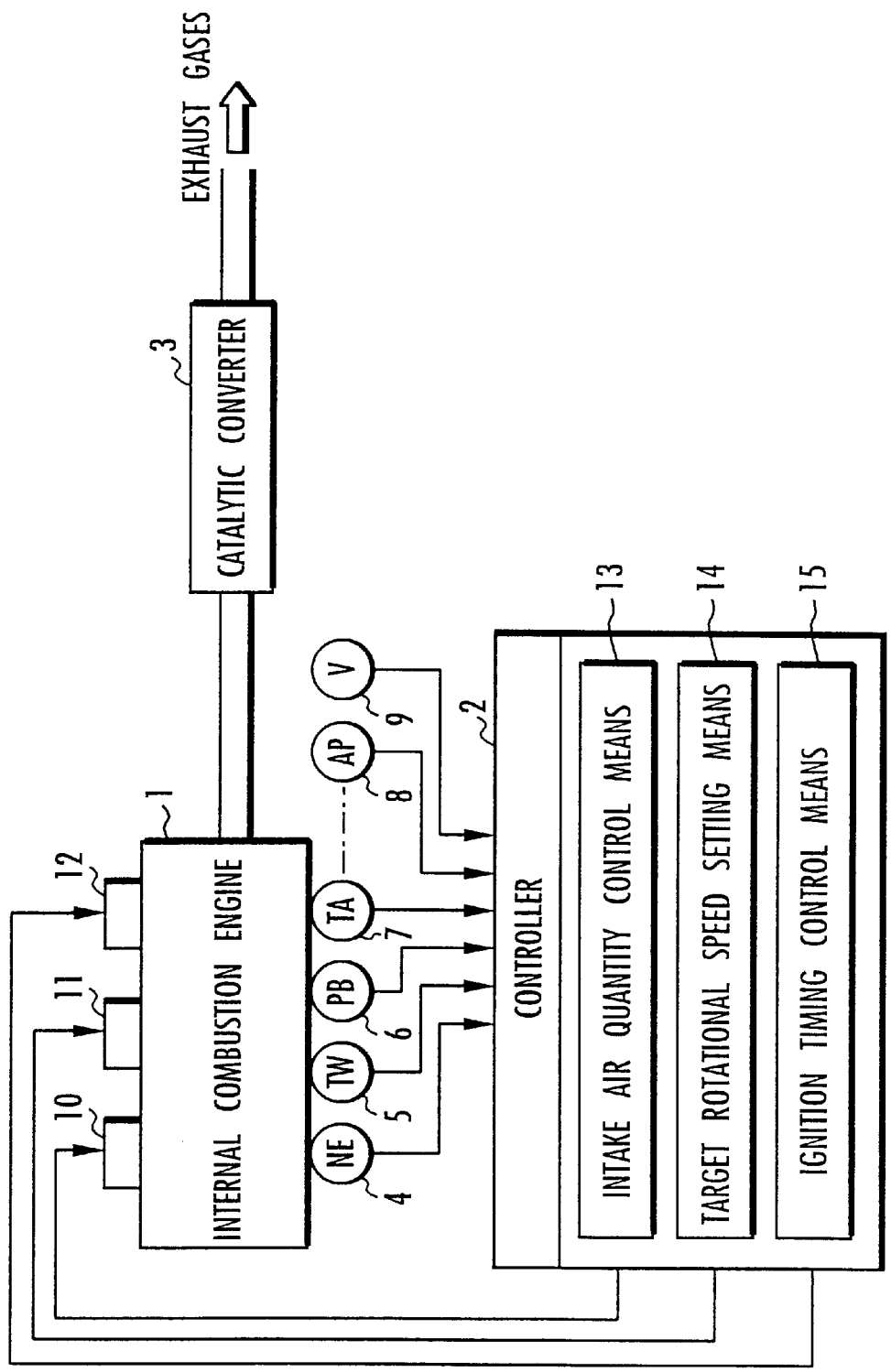
FIG. 1 is a block diagram of a control system for controlling an internal combustion engine according to the present invention.

FIG. 1 shows in block form a control system for controlling an internal combustion engine 1 according to the present invention. In FIG. 1, the control system includes a controller 2 for controlling operation of the internal combustion engine 1.

The internal combustion engine 1 is mounted as a propulsion source on a vehicle such as an automobile, a hybrid vehicle or the like (not shown). The internal combustion engine 1 burns a mixture of air and fuel and emits exhaust gases through a catalytic converter 3 comprising a three-way catalyst into the atmosphere.

The control system includes, as ancillary components for controlling operation of the internal combustion engine 1, a rotational speed sensor 4 for detecting a rotational speed NE (actual rotational speed) of the internal combustion engine 1, an engine temperature sensor 5 for detecting an engine temperature TW (e.g., a coolant temperature) of the internal combustion engine 1, an intake pressure sensor 6 for detecting an intake pressure PB in the internal combustion engine 1, an atmospheric temperature sensor 7 for detecting an atmospheric temperature TA, an accelerator sensor 8 for detecting a manipulated quantity AP of the accelerator pedal (not shown) of the vehicle, and a vehicle speed sensor 9 for detecting a speed V of the vehicle.

The internal combustion engine 1 has, as ancillary components for operating the internal combustion engine 1, an ignition unit 10 for igniting the air-fuel mixture in the internal combustion engine 1, a fuel supply unit 11 for supplying a fuel into the internal combustion engine 1, and a throttle valve actuator 12 for operating a throttle valve (not shown) in the internal combustion engine 1.

Intake air is introduced into the internal combustion engine 1 via a passage (not shown) with the throttle valve disposed therein and a bypass passage (not shown) which bypasses the throttle valve.

The vehicle also has a starter motor (not shown) for starting to operate the internal combustion engine 1, a power supply battery (not shown) for supplying electric energy to various electric devices on the vehicle, and a transmission, i.e., an automatic transmission in the illustrated embodiment, for transmitting drive power from the internal combustion engine 1 to drive wheels of the vehicle. The vehicle further has pumps combined with a power steering system and an air-conditioning unit (not shown), the pumps being operable by and serving as loads on the internal combustion engine 1.

The controller 2, which comprises a microcomputer, controls the ignition unit 10, the fuel supply unit 11, and the throttle valve actuator 12 based on output data (detected values) from the sensors 4 through 9, a predetermined program, and preset data values, for thereby operating the internal combustion engine 1.

The controller 2 has, as functional components, an intake air quantity control means 13 for controlling the throttle valve actuator 12 to increase the quantity of intake air supplied to the internal combustion engine 1 while the internal combustion engine 1 is idling after it has started to operate, a target rotational speed setting means 14 for setting up a target rotational speed of the internal combustion engine 1 when the quantity of intake air is creased, and an ignition timing control means 15 for controlling the ignition unit 10 to control the ignition timing of the internal combustion engine 1 for converging the actual rotational speed (represented by the output of the rotational speed sensor 4) of the internal combustion engine 1 to the target rotational speed. Details of the functions of these means 13, 14, 15 will be described later on.

In this embodiment, a control cycle (control period) which is controlled by the controller 2 is a crank angle period (so-called TDC).

Operation of the control system will be described below in combination with more specific functions of the controller 2.

Figure 2:
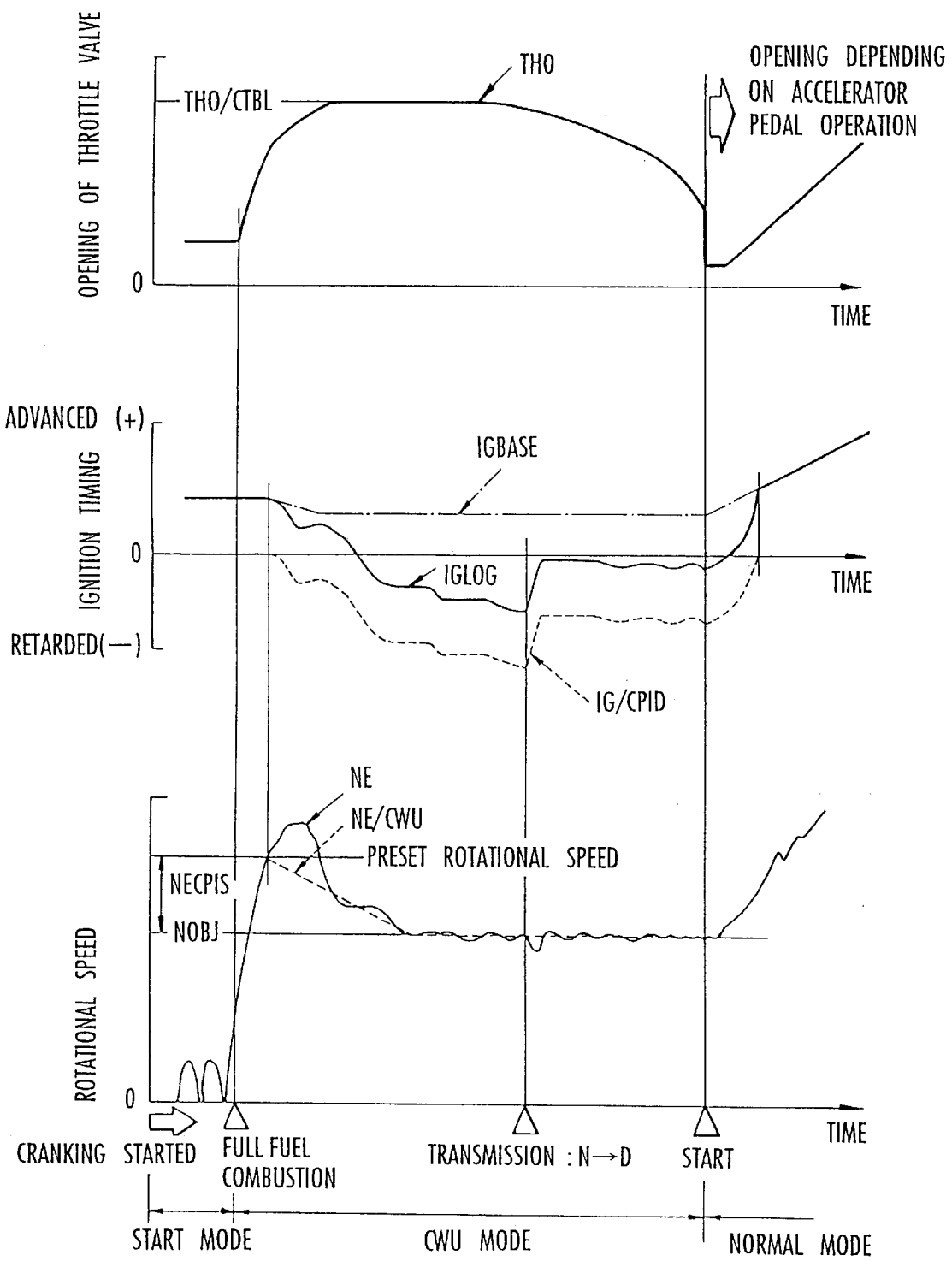
FIG. 2 is a diagram illustrative of a control process of the control system shown in FIG. 1.

First, a basic operation of the control system will briefly be described below with reference to FIG. 2. FIG. 2 shows, by way of example, time-dependent changes in the opening of the throttle valve, the ignition timing, and the rotational speed, respectively, of the internal combustion engine 1 in upper, middle, and lower diagram sections.

In FIG. 2, when the control system is activated by pressing a start switch (not shown) while the internal combustion engine 1 is not in operation, the control system first enters an operation mode to start the internal combustion engine 1 (hereinafter referred to as a "start mode") by cranking the internal combustion engine 1 with a starter motor (not shown). In the start mode, the throttle valve opening and the ignition timing are controlled as shown, and the rotational speed of the internal combustion engine 1 varies as shown.

When a complete fuel combustion in the internal combustion engine 1 is confirmed in the start mode, the control system enters an operation mode (hereinafter referred to as a "CWU mode") for quickly activating the catalytic converter 3 while the internal combustion engine 1 is idling.

In the CWU mode, an opening THO of the throttle valve (hereinafter referred to as a "throttle valve opening THO") which determines the amount of intake air introduced into the internal combustion engine 1 is controlled so as to increase the amount of intake air introduced into the internal combustion engine 1 (THO>0) in a pattern of time-dependent changes shown in the upper diagram section in FIG. 2. The amount of intake air introduced into the internal combustion engine 1 is thus made greater than in the normal idling mode. In the illustrated control system, the throttle valve opening THO is "0" when the internal combustion engine 1 is in the normal idling mode (other than the CWU mode) as when the vehicle temporarily stops while traveling. At this time, intake air is introduced into the internal combustion engine 1 via only the bypass passage bypassing the throttle valve. Therefore, when the throttle valve opening THO is controlled as described above, the amount of intake air introduced into the internal combustion engine 1 in the CWU mode is made greater than in the normal idling mode in the same pattern of time-depending changes as with the throttle valve opening THO (the throttle valve opening THO corresponds to a throttle valve opening for adding an increase in the amount of intake air to the amount of intake air introduced in the normal idling mode).

The pattern of changes in the throttle valve opening THO, i.e., the pattern of changes in the increase in the amount of intake air, is appropriately corrected in order to reduce the increase in the amount of intake air under certain conditions.

The rotational speed NE (actual rotational speed) of the internal combustion engine 1 in the CWU mode increases as the amount of introduced intake air increases (the throttle valve opening THO increases) in a pattern of time-dependent changes as indicated by the solid-line curve in the lower diagram section of FIG. 2. When the rotational speed NE reaches a preset rotational speed (NOBJ+NECPIS) which is higher than a predetermined idling rotational speed NOBJ by a given value NECPIS, a target rotational speed NE/CWU of the internal combustion engine 1 is established in a pattern of time-dependent changes as indicated by the broken-line curve in the lower diagram section of FIG. 2.

According to a feedback control process (based on a PI control process in the illustrated embodiment) for converging the rotational speed NE of the internal combustion engine 1 to the target rotational speed NE/CWU, a corrective quantity IG/CPID (indicated by the broken-line curve in the middle diagram section of FIG. 2, hereinafter referred to as a "retarded angle corrective quantity IG/CPID") is determined for the ignition timing of the internal combustion engine 1. A basic ignition timing IGBASE (indicated by the dot-and-dash-line curve in the middle diagram section of FIG. 2) is corrected by the retarded angle corrective quantity IG/CPID to determine an ignition timing IGLOG (more accurately, a command value for the ignition timing) as indicated by the solid-line curve in the middle diagram section of FIG. 2.

According to the above feedback control process, the target rotational speed NE/CWU of the internal combustion engine 1 decreases from the preset rotational speed (NOBJ+NECPIS) to the idling rotational speed NOBJ at a predetermined decremental rate (gradient). After having reached the idling rotational speed NOBJ, the target rotational speed NE/CWU is maintained at the idling rotational speed NOBJ. The idling rotational speed NOBJ is set to a rotational speed higher than the rotational speed of the internal combustion engine 1 when it is in the normal idling mode.

At this time, the throttle valve opening THO is controlled to increase the amount of intake air introduced into the internal combustion engine 1 for thereby increase the rotational speed NE (actual rotational speed) of the internal combustion engine 1 with respect to the target rotational speed NE/CWU. Thus, the retarded angle corrective quantity IG/CPID for the ignition timing determined by the feedback control process basically serves to correct the ignition timing as to be retarded. As a result, the ignition timing IGLOG of the internal combustion engine 1 is retarded as indicated by the solid-line curve in the middle diagram section of FIG. 2.

The control of the ignition timing IGLOG according to the feedback control process and the setting of the target rotational speed NE/CWU are started when an elapsed time from the start of the internal combustion engine 1 reaches a predetermined value even if the rotational speed NE of the internal combustion engine 1 does not reach the preset rotational speed (NOBJ+NECPIS). The above feedback control process will hereinafter be referred to as an "ignition timing control rotational speed F/B control process".

When the driver of the vehicle presses the accelerator pedal to start the vehicle while in the CWU mode, the CWU mode is canceled, and the control system enters an operation mode for operating the internal combustion engine 1 depending on the operation of the accelerator pedal (hereinafter referred to as a "normal mode"). In the normal mode, the throttle valve opening THO is controlled directly depending on the amount of operation of the accelerator pedal (see a right-hand area of the upper diagram section of FIG. 2). After the CWU mode is canceled, the ignition timing IGLOG of the internal combustion engine 1 returns gradually to the basic ignition timing IGBASE which is advanced, as indicated in a right-hand area of the middle diagram section of FIG. 2.

The CWU may be omitted depending on the situation, and may be canceled under conditions other than when the accelerator pedal is pressed.

The basic operation of the control system according to the illustrated embodiment has been described above.

Details of the operation of the control system in view of the basic operation thereof together with detailed functions of the controller 2 will be described below.

Figure 3:
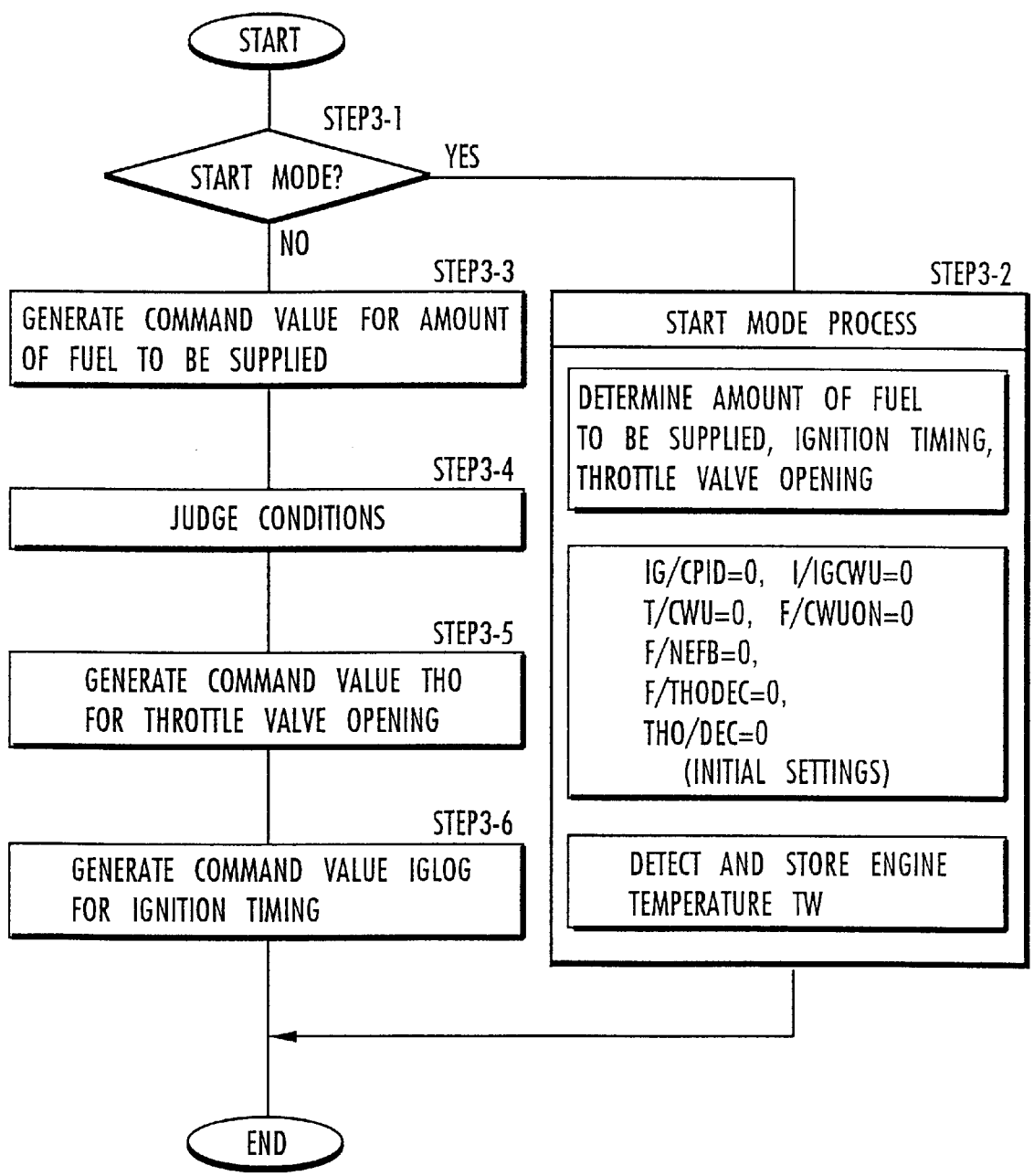
FIG. 3 is a flowchart of a main routine of the control process of the control system shown in FIG. 1.

When the control system is activated while the internal combustion engine 1 is not operating, the controller 2 executes a main routine shown in FIG. 3 in predetermined control cycles, i.e., crank angle periods (TDC).

First, the controller 2 determines whether the operation mode of the control system is the start mode or not in STEP3-1. Specifically, the controller 2 determines whether a complete fuel combustion in the internal combustion engine 1 is confirmed or not. The operation mode of the control system is the start mode after the control system is activated until the complete fuel combustion is confirmed. The complete fuel combustion is confirmed on the basis of an output signal from the rotational speed sensor 4, i.e., a detected value of the rotational speed NE.

If the operation mode of the control system is the start mode in STEP3-1, then the controller 2 executes a start mode process for starting the internal combustion engine 1 in each control cycle in STEP3-2.

In the start mode process, the controller 2 determines command values for the amount of fuel to be supplied, the ignition timing, and the throttle valve opening, which are suitable for starting the internal combustion engine 1, based on output signals (detected values) of the sensors 4 through 8, predetermined maps, and equations. According to the determined command values, the controller 2 operates the fuel supply unit 11, the ignition unit 10, and the throttle valve actuator 12 to control the amount of fuel to be supplied, the ignition timing, and the throttle valve opening (the amount of intake air), while at the same time energizing the starter motor (not shown) to crank the internal combustion engine 1 thereby to start the internal combustion engine 1.

In the start mode process, the controller 2 initializes various parameters (described in detail later on) such as flags to be used in a control process (described in detail later on) of the CWU mode. In the start mode process, furthermore, an engine temperature TW at the time the internal combustion engine 1 is started is detected by the engine temperature sensor 5, and stored in a memory (not shown).

If the operation mode of the control system is not the start mode in STEP3-1, i.e., if a complete fuel combustion in the internal combustion engine 1 is confirmed, then the controller 2 generates a command value for the amount of fuel to be supplied to the internal combustion engine 1 in STEP3-3. Then, the controller 2 judges conditions to determine whether the control process of the CWU mode is to be carried out or not in STEP3-4. Thereafter, the intake air quantity control means 13 calculates a command value THO for the throttle valve opening in STEP3-5. The ignition timing control means 15 calculates a command value IGLOG for the ignition timing of the internal combustion engine 1 in STEP3-6. After these steps have been carried out, the processing of the control system in the present control cycle is finished.

The controller 2 generates a command value for the amount of fuel to be supplied to the internal combustion engine 1 in STEP3-3 as follows: First, the controller 2 determines a basic amount of fuel to be supplied based on a predetermined map from the rotational speed NE of the internal combustion engine 1 detected by the rotational speed sensor 4 and the intake pressure PB of the internal combustion engine 1 detected by the intake pressure sensor 6. The controller 2 then corrects the basic amount of fuel to be supplied depending on the engine temperature TW and the atmospheric temperature TA detected respectively by the engine temperature sensor 5 and the atmospheric temperature sensor 7, thereby generating the command value for the amount of fuel to be supplied to the internal combustion engine 1.

The generated command value for the amount of fuel to be supplied is given from the controller 2 to the fuel supply unit 11, and the fuel supply unit 11 supplies an amount of fuel to the internal combustion engine 1 according to the given command value.

Figure 4:
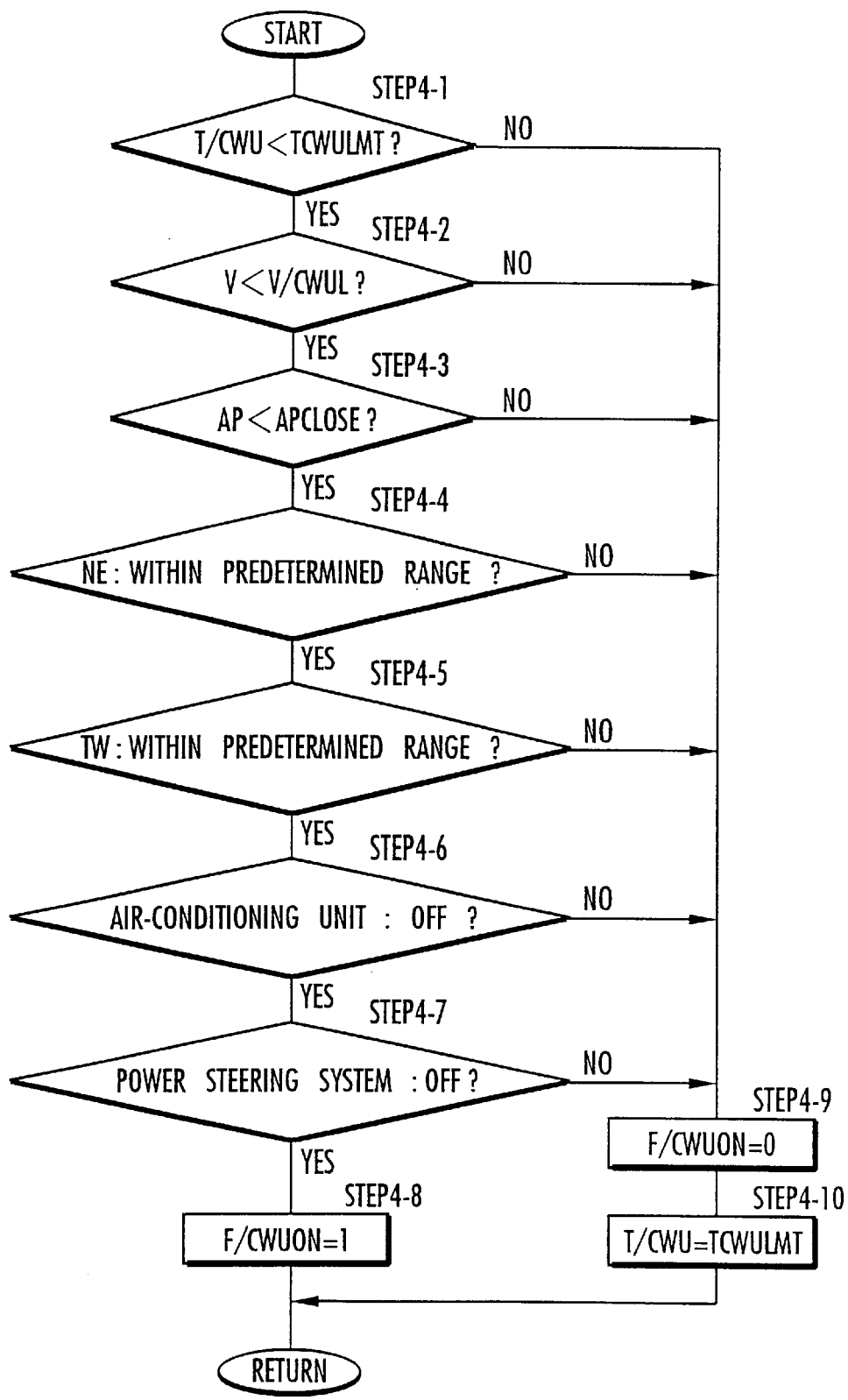
FIG. 4 is a flowchart of a subroutine of the control process of the control system shown in FIG. 1.

In STEP3-4, conditions are judged according to a processing sequence shown in FIG. 4.

As shown in FIG. 4, the controller 2 determines whether an elapsed time T/CWU of the CWU mode (an elapsed time after the start mode is ended, hereinafter referred to as a "CWU elapsed time T/CWU") is within a predetermined limit time TCWULMT (T/CWU<TCWULMT) or not, in STEP4-1. The CWU elapsed time T/CWU is initialized to "0" in the start mode process (STEP3-2 in FIG. 3), and starts being measured by a count-up timer (not shown) that starts operating in predetermined periods when the start mode is ended ("NO" in STEP3-1).

If T/CWU≧TCWULMT in STEP4-1, then a flag F/CWUON (hereafter referred to as a "CWU on/off flag F/CWUON") is set to "0", setting the operation mode of the control system to the normal mode in STEP4-9. The CWU on/off flag F/CWUON is "1" when the operation mode of the control system is to be set to the CWU mode, and "0" the operation mode of the control system is to be set to the normal mode. Then, the CWU elapsed time T/CWU is forcibly set to the limit time TCWULMT in STEP4-10. The limit time TCWULMT is selected to be of a time interval capable of sufficiently increasing the temperature of and activating the catalytic converter 3 by increasing the amount of intake air introduced into the internal combustion engine 1 and retarding the ignition timing (under the control of the CWU mode) within the limit time TCWULMT.

If the condition of STEP4-1 is met (T/CWU<TCWULMT), then the controller 2 determines whether a detected value of the vehicle speed V from the vehicle speed sensor 9 is smaller than a predetermined value V/CWUL, indicating that the vehicle is at rest, or not in STEP4-2. Then, the controller 2 determines whether a detected value of the manipulated quantity AP of the accelerator pedal from the accelerator sensor 8 is smaller than a predetermined value APCLOSE, indicating that the accelerator pedal is substantially fully closed, or not in STEP4-3. If the conditions of STEP4-2, STEP4-3 are not satisfied, i.e., if the internal combustion engine 1 is not idling, then the processing in STEP4-9, STEP4-10 is performed (the operation mode of the control system is set to the normal mode).

If the conditions of STEP4-2, STEP4-3 are satisfied, i.e., if the internal combustion engine 1 is idling, then the controller 2 determines whether a present detected value of the rotational speed NE of the internal combustion engine 1 from the rotational speed sensor 4 falls within a predetermined range or not in STEP4-4 and then determines whether a present detected value of the engine temperature TW from the engine temperature sensor 5 falls within a predetermined range or not in STEP4-5. If the conditions of STEP4-4, STEP4-5 are not satisfied, then the processing in STEP4-9, STEP4-10 is performed (the operation mode of the control system is set to the normal mode).

If the conditions of STEP4-4, STEP4-5 are satisfied, then the controller 2 determines whether the air-conditioning unit, more precisely a compressor associated with the air-conditioning unit, is turned off or not, more specifically whether the clutch of the compressor associated with the air-conditioning unit is disengaged or not, in STEP4-6, and then determines whether the power steering system, more precisely a hydraulic pump associated with the power steering system, is turned off or not, more specifically whether the hydraulic pump associated with the power steering system is under no load or not, in STEP4-7. If the air-conditioning unit or the power steering system is not turned off, i.e., if either one of the air-conditioning unit and the power steering system is operating, then the processing in STEP4-9, STEP4-10 is performed (the operation mode of the control system is set to the normal mode). If the conditions of STEP4-6, STEP4-7 are satisfied (at this time, all the conditions of STEP4-1 through STEP4-7 are satisfied), then the CWU on/off flag F/CWUON is set to "1", setting the operation mode of the control system to the CWU mode in STEP4-8.

After the internal combustion engine 1 has started to operate, if the states of the vehicle, the air-conditioning unit, the power steering system, which serve as loads on the internal combustion engine 1, the rotational speed NE, the engine temperature TW, and the CWU elapsed time T/CWU satisfy the conditions of STEP4-1 through STEP4-7, then the operation mode of the control system is set to the CWU mode (F/CWUON=1).

If the control system is in a situation where the vehicle, the air-conditioning unit, the power steering system, which serve as loads on the internal combustion engine 1, are to be activated immediately after the start of the internal combustion engine 1, or such a situation occurs while in the CWU mode, then since the conditions of STEP4-2, STEP4-3, STEP4-6, STEP4-7 are not satisfied, the operation mode of the control system is set to the normal mode immediately after the start of the internal combustion engine 1, or the CWU mode is canceled, and the operation mode of the control system is set to the normal mode (F/CWUON=0).

Similarly, in a situation where the rotational speed NE and the engine temperature TW are too high or low, since the conditions of STEP4-4, STEP4-5 are not satisfied, the operation mode of the control system is set to the normal mode immediately after the start of the internal combustion engine 1, or the CWU mode is canceled, and the operation mode of the control system is set to the normal mode (F/CWUON=0).

If the elapsed time (=CWU elapsed time T/CWU) of the operation of the internal combustion engine 1 in the CWU mode is equal to or greater than the limit time TCWULMT ("NO" in STEP4-1), then the CWU mode is canceled, and the operation mode of the control system is set to the normal mode (F/CWUON=0).

If the operation mode of the control system is set to the normal mode, then as long as the operation of the internal combustion engine 1 continues, the CWU elapsed time T/CWU is fixed to the limit time TCWULMT in STEP4-10. Subsequently, therefore, the condition of STEP4-1 is not satisfied unless the internal combustion engine 1 is started again (the CWU elapsed time T/CWU is initialized only in the start mode). Therefore, the operation mode of the control system is not set to the CWU mode while the vehicle is running or the internal combustion engine 1 is idling (normal idling mode) when the vehicle is temporarily at rest.

Thus, operation mode of the control system is set to the CWU mode within the limit time TCWULMT under certain conditions of the loads on the internal combustion engine 1, the rotational speed NE, and the engine temperature TW only during the first idling operation of the internal combustion engine 1 after the start of the internal combustion engine 1.

In this embodiment, the engine temperature TW as representing the temperature of the catalytic converter 3 is used in the condition judging process shown in FIG. 4, particularly in STEP4-5. However, the temperature of the catalytic converter 3 may directly be detected, and may be used in determining the condition of STEP4-5.

The operation of the control system may be inhibited from being set to the CWU mode until a certain time elapses after the end of the start mode, though such a scheme is not employed in the present embodiment.

Figure 5:
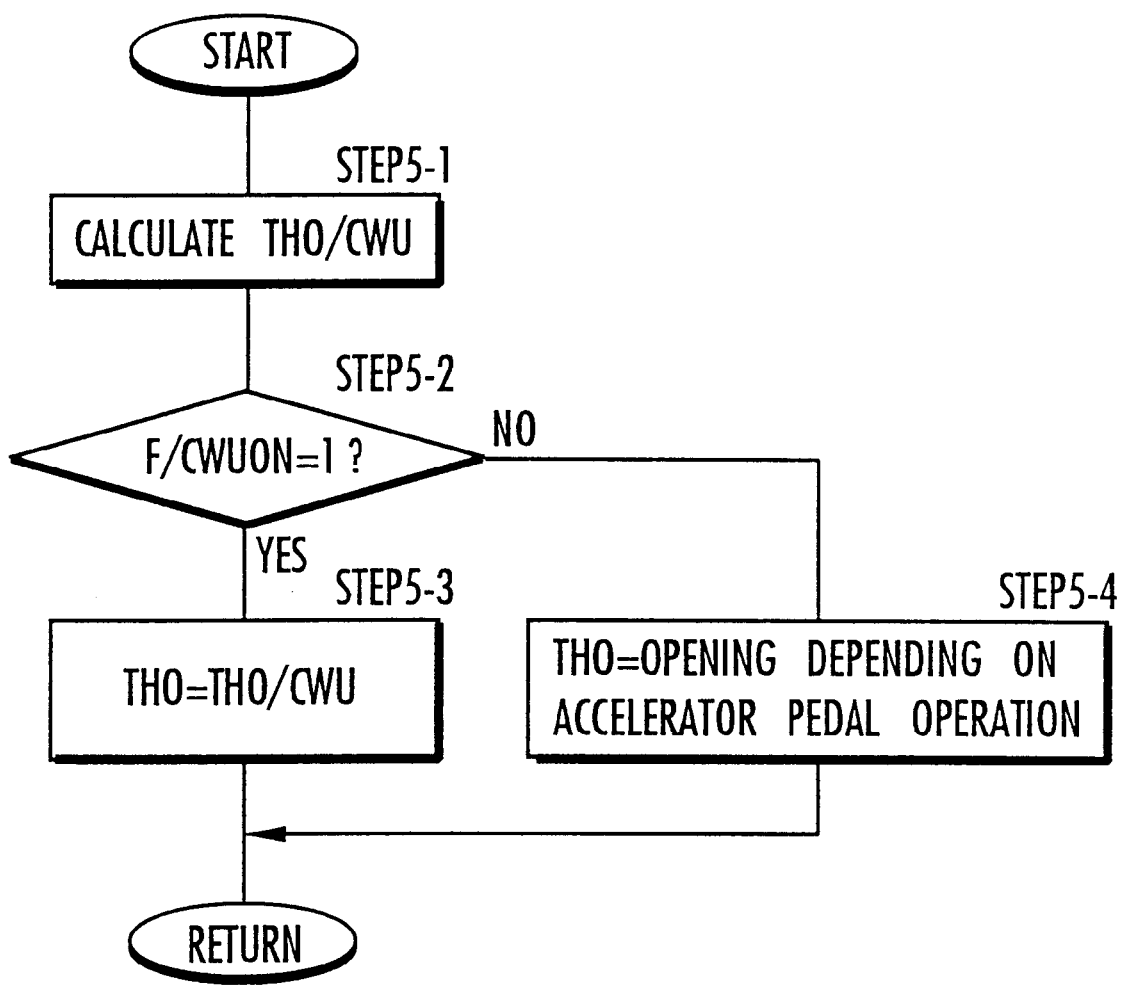
FIG. 5 is a flowchart of a subroutine of the control process of the control system shown in FIG. 1.
Figure 6:
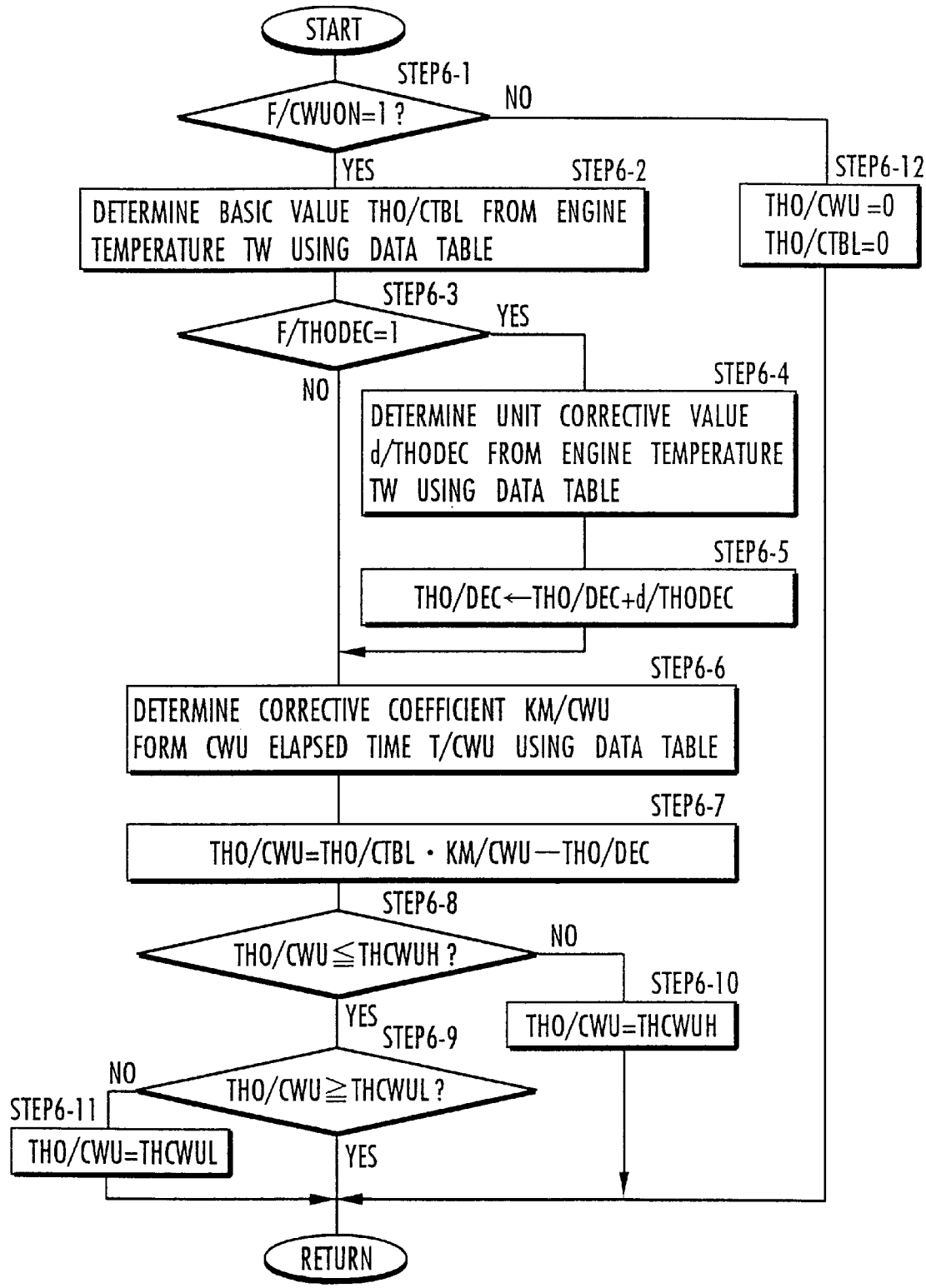
FIG. 6 is a flowchart of a subroutine of the control process of the control system shown in FIG. 1.

The process of calculating the command value THO for the throttle valve opening in STEP3-5 shown in FIG. 3 is carried out by the intake air quantity control means 13 of the controller 2 according to flowcharts shown in FIGS. 5 and 6.

As shown in FIG. 5, the intake air quantity control means 13 calculates a command value THO/CWU for the throttle valve opening in the CWU mode based on the engine temperature TW detected by the engine temperature sensor 5 in the start mode process (STEP3-2) and the CWU elapsed time T/CWU in STEP5-1.

More specifically, in the calculating process of STEP5-1, as shown in FIG. 6, the intake air quantity control means 13 determines the value of the CWU on/off flag F/CWUON in STEP6-1. If F/CWUON=1, i.e., if the operation mode of the control system is set to the CWU mode in STEP3-4, then the intake air quantity control means 13 determines a basic value THO/CTBL of the command value THO/CWU for the throttle valve opening in order to make the amount of intake air introduced into the internal combustion engine 1 in the CWU mode greater than in the normal idling mode, from the detected value of the engine temperature TW acquired in the start mode process (STEP3-2) using a predetermined data table shown in FIG. 7, in STEP6-2.

Figure 7:
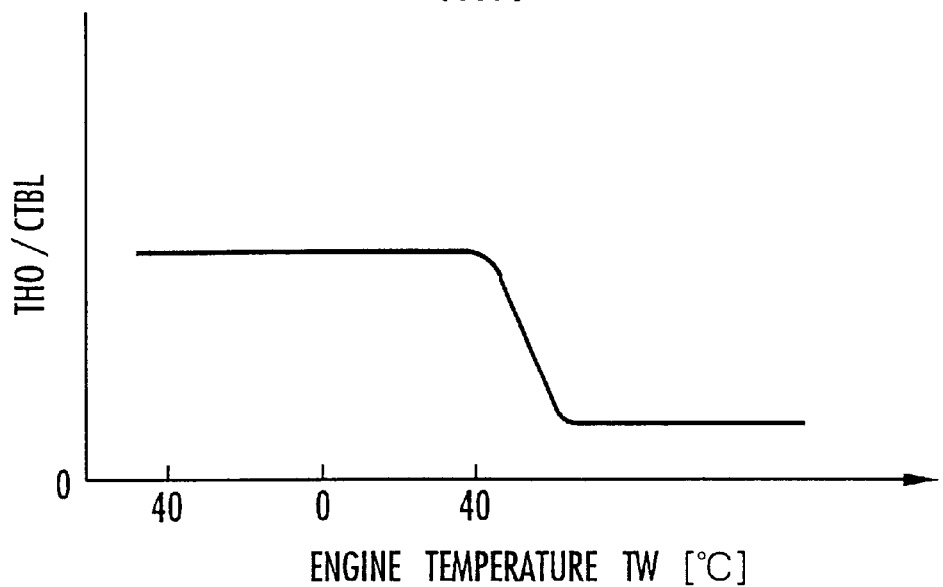
FIG. 7 is a diagram showing a data table used in the subroutine shown in FIG. 6.

The data table shown in FIG. 7 is established such that the basic value THO/CTBL of the command value THO/CWU for the throttle valve opening is substantially constant in a low and medium range of the engine temperature TW (which is an ordinary range of the engine temperature TW), and is smaller in a high range of the engine temperature TW than in the low and medium range of the engine temperature TW. Specifically, if the engine temperature TW at the time the internal combustion engine 1 starts to operate is high, then since the temperature of the catalytic converter 3 is also relatively high, the amount of heat required to increase the temperature of and activate the catalytic converter 3 may be small. In the illustrated embodiment, therefore, when the engine temperature TW at the time the internal combustion engine 1 starts to operate is in the high range, the basic value THO/CTBL of the command value THO/CWU for the throttle valve opening made smaller than in the low and medium range, reducing the increase in the amount of intake air introduced into the internal combustion engine 1.

In STEP6-2, the engine temperature TW detected in the start mode process is regarded representing the temperature of the catalytic converter 3 at the time the internal combustion engine 1 starts to operate, and the basic value THO/CTBL is determined from the engine temperature TW. Therefore, if the temperature (initial temperature) of the catalytic converter 3 at the time the internal combustion engine 1 starts to operate is directly detected by a temperature sensor or the like, then the basic value THO/CTBL may be determined from the detected value of the temperature of the catalytic converter 3 according to the same pattern as the data table shown in FIG. 7.

After the basic value THO/CTBL is determined, the intake air quantity control means 13 determines the present value of a flag F/THODEC (hereinafter referred to as an "increase correction flag F/THODEC") in STEP6-3. The increase correction flag F/THODEC is "1" when the throttle valve opening THO (an increase in the amount of intake air) is to be corrected so as to be reduced, and "0" when the throttle valve opening THO is not to be corrected so as to be reduced. The increase correction flag F/THODEC is initialized to "0" in the start mode process (STEP3-2), and may be set to "1" as necessary in a process of limiting the command value IGLOG for the ignition timing as described later on.

If F/THODEC=0, i.e., if the throttle valve opening THO is not to be corrected so as to be reduced, then control goes to STEP6-6.

Figure 8:
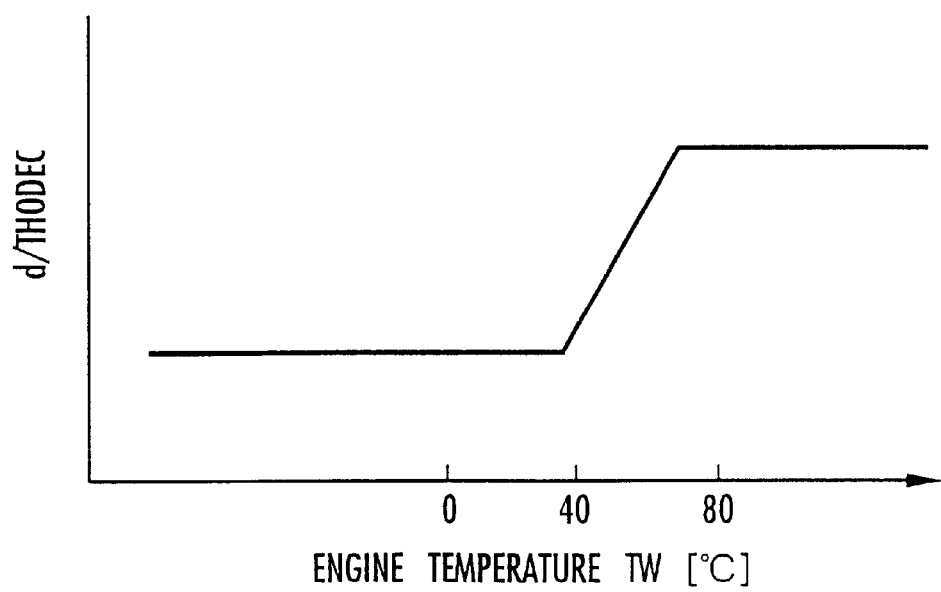
FIG. 8 is a diagram showing a data table used in the subroutine shown in FIG. 6.

If F/THODEC=1, i.e., if the throttle valve opening THO is to be corrected so as to be reduced, then the intake air quantity control means 13 determines a unit corrective value d/THODEC (>0) in each control cycle for the throttle valve opening THO from the detected value (which indicates a warmed state of the internal combustion engine 1 at its start) of the engine temperature TW obtained in the start mode process, using a predetermined data table shown in FIG. 8 in STEP6-4. The data table shown in FIG. 8 is established such that the unit corrective value d/THODEC is relatively small in the low and medium range of the engine temperature TW, and greater in the high range of the engine temperature TW.

The intake air quantity control means 13 adds the determined unit corrective value d/THODEC to the present value of a corrective quantity THO/DEC ($\geq 0$, hereinafter referred to as a "throttle corrective quantity THO/DEC") for the throttle valve opening THO for reducing the throttle valve opening THO (an increase in the amount of intake air), thereby updating the throttle corrective quantity THO/DEC in STEP6-5. Thereafter, control goes to STEP6-6. The throttle corrective quantity THO/DEC is initialized to "0" in the start mode process (STEP3-2).

Figure 9:
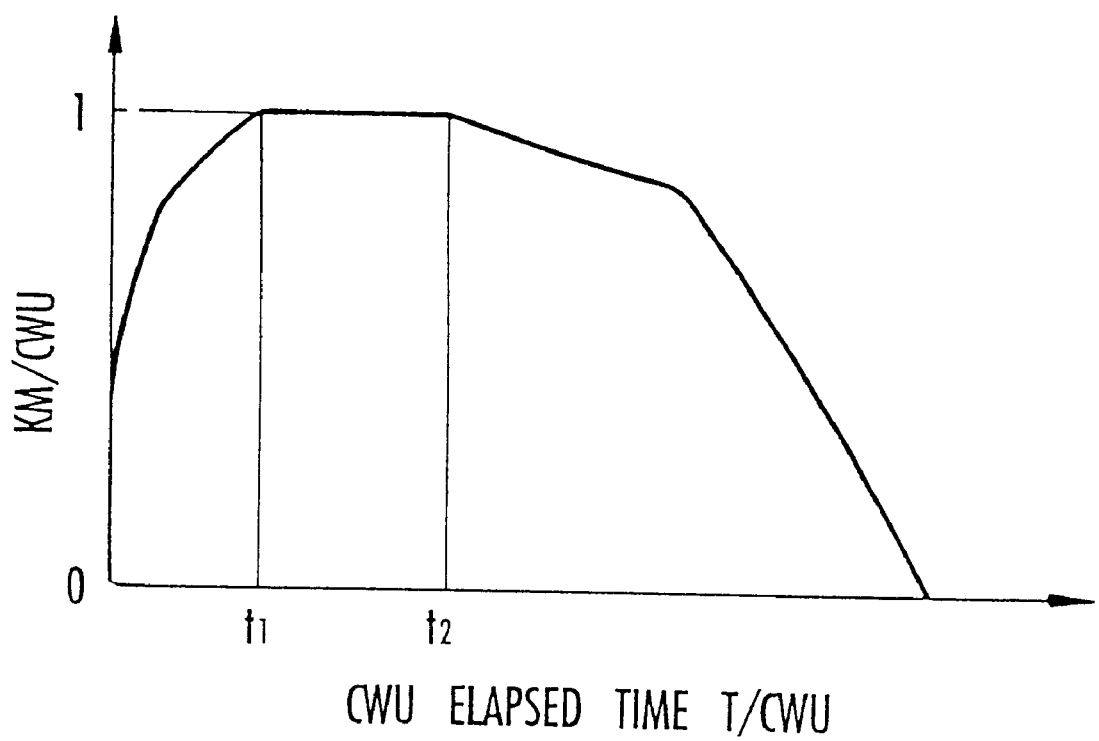
FIG. 9 is a diagram showing a data table used in the subroutine shown in FIG. 6.

In STEP6-6, the intake air quantity control means 13 determines a basic value corrective coefficient KM/CWU for correcting the basic value THO/CTBL of the command value THO/CWU for the throttle valve opening determined in STEP6-2 depending on the CWU elapsed time T/CWU, from the CWU elapsed time T/CWU using a predetermined data table (time table) shown in FIG. 9. The basic value corrective coefficient KM/CWU is a coefficient ($\leq 1$) for correcting the basic value THO/CTBL by multiplying the basic value THO/CTBL. The data table shown in FIG. 9 is established such that the basic value corrective coefficient KM/CWU gradually increases with time toward a maximum value "1" in an initial stage (time 0–time t1) of the CWU elapsed time T/CWU, is thereafter continuously maintained at the maximum value "1" for a given period (time t1–time t2), and then gradually decreases with time.

The data table shown in FIG. 9 may have different versions one for use when the shift lever of the automatic transmission of the vehicle is in an N (neutral) range and one for use when the shift lever of the automatic transmission of the vehicle is in a D (drive) range. Such different data tables are useful because different loads are imposed on the internal combustion engine 1 when the automatic transmission is in the N and D ranges, respectively. The fuel combustion in the internal combustion engine 1 can be controlled more optimally using the different data tables depending on the load on the internal combustion engine 1.

Then, the intake air quantity control means 13 multiplies the basic value THO/CTBL of the command value THO/CWU for the throttle valve opening determined in STEP6-2 by the basic value corrective coefficient KM/CWU determined in STEP6-6. The intake air quantity control means 13 subtracts the present throttle corrective quantity THO/DEC (if F/THODEC=0 in STEP6-3) or the throttle corrective quantity THO/DEC updated in STEP6-5 (if F/THODEC=1 in STEP6-3) from the product of the basic value THO/CTBL and the basic value corrective coefficient KM/CWU, for thereby calculating the command value THO/CWU for the throttle valve opening in the CWU mode in STEP6-7. In this manner, the command value THO/CWU for the throttle valve opening in the CWU mode is determined in a feed-forward control fashion.

The intake air quantity control means 13 determines whether the command value THO/CWU for the throttle valve opening calculated in STEP6-7 falls in a range defined between a predetermined upper limit TCHWUH and a predetermined lower limit TCHWUL in STEP6-8 and STEP6-9. If the command value THO/CWU for the throttle valve opening is greater than the upper limit TCHWUH or smaller than the lower limit TCHWUL, then the command value THO/CWU for the throttle valve opening is limited to the upper limit TCHWUH in STEP6-10 or to the lower limit TCHWUL in STEP6-11.

If F/CWUON=0 in STEP6-1, i.e., if the operation mode of the control system is set to the normal mode in STEP3-4, then the command value THO/CWU for the throttle valve opening and the value of the basic value corrective coefficient KM/CWU are initialized to "0" in STEP6-12.

Referring back to FIG. 5, after the command value THO/CWU for the throttle valve opening in the CWU mode is determined, the intake air quantity control means 13 determines the value of the CWU on/off flag F/CWUON in STEP5-2. If F/CWUON=1, i.e., if the operation mode of the control system is set to the CWU mode, then the final command value THO for the throttle valve opening is determined to be the command value THO/CWU determined in STEP5-1 in STEP5-3.

If F/CWUON=0 in STEP5-2, i.e., if the operation mode of the control system is set to the normal mode, then the intake air quantity control means 13 determines the final command value THO for the throttle valve opening to be a value depending on the detected value of the manipulated quantity AP of the accelerator pedal in STEP5-4. While the internal combustion engine 1 is in the normal idling mode with the accelerator pedal being not pressed, the command value THO for the throttle valve opening depending on the manipulated quantity AP of the accelerator pedal in the normal mode is smaller than the command value THO/CWU for the throttle valve opening which is determined depending on the engine temperature TW and the CWU elapsed time T/CWU in the CWU mode.

After the start of the internal combustion engine 1, if the operation mode of the control system is set to the CWU mode in STEP3-4, the command value THO for the throttle valve opening is determined to be a value depending on the engine temperature TW and the CWU elapsed time T/CWU according to a feed-forward control process. If the operation mode of the control system is set to the normal mode in STEP3-4, then the command value THO for the throttle valve opening is determined to be a value depending on the manipulated quantity AP of the accelerator pedal. The controller 2 then supplies the determined command value THO for the throttle valve opening to the throttle actuator 12. The throttle actuator 12 then actuates the throttle valve according to the supplied command value THO for the throttle valve opening. Therefore, the amount of intake air introduced into the internal combustion engine 1 is controlled according to the command value THO for the throttle valve opening.

The command value THO for the throttle valve opening while the internal combustion engine is idling in the CWU mode is determined to be greater than while the internal combustion engine is normally idling in the normal mode, such as when the vehicle is temporarily at rest. Consequently, the amount of intake air introduced into the internal combustion engine 1 is made greater than in the normal idling mode.

If the throttle corrective quantity THO/DEC is "0" (the increase in the amount of intake air is not corrected), then as indicated by the solid-line curve in the upper diagram section of FIG. 2, the command value THO (=THO/CWU) for the throttle valve opening in the CWU mode gradually rises toward the basic value THO/CTBL in an initial stage immediately after the start of the CWU mode, thereafter remains continuously at the basic value THO/CTBL, and then gradually decreases from the basic value THO/CTBL with time, because of the characteristics (see FIG. 9), described above, of the time table of the basic value corrective coefficient KM/CWU. The amount of intake air introduced into the internal combustion engine 1 is made greater than in the normal idling mode in a pattern of time-dependent changes similar to the above pattern. Therefore, the product (=THO/CTBL·KM/CWU) of the basic value THO/CTBL and the basic value corrective coefficient KM/CWU determines a basic pattern of the increase in the amount of intake air controlled by the intake air quantity control means 13. Since the basic value THO/CTBL is established depending on the engine temperature TW representing the temperature of the catalytic converter 3 upon the start of the internal combustion engine 1, the increase in the amount of intake air also depends on the temperature of the catalytic converter 3 upon the start of the internal combustion engine 1.

If the throttle corrective quantity THO/DEC is not "0" (THO/DEC>0), then the throttle valve opening THO is reduced from the basic throttle valve opening (THO/CTBL·KM/CWU) based on the basic value THO/CTBL and the basic value corrective coefficient KM/CWU by the throttle corrective quantity THO/DEC (see STEP6-7). Thus, the increase in the amount of intake air is corrected so as to be reduced from the basic increase by an amount corresponding to the throttle corrective quantity THO/DEC. If the increase correction flag F/THODEC is "1" (in this case, the command value IGLOG for the ignition timing determined by a PI control process, described later on, according to the ignition timing control rotational speed F/B control process is more retarded than a predetermined threshold), then the throttle corrective quantity THO/DEC is incremented by the unit corrective value d/THODEC in each control cycle in STEP6-5. Consequently, the corrective quantity by which the increase in the amount of intake air is reduced is incremented by an amount corresponding to the unit corrective value d/THODEC in each control cycle.

If the increase correction flag F/THODEC changes from "1" to "0" while the throttle corrective quantity THO/DEC is being incremented by the unit corrective value d/THODEC; then since the processing of STEP6-5 is not carried out, the throttle corrective quantity THO/DEC is not updated, but is kept at the present value.

The significance of reducing the increase in the amount of intake air by the throttle corrective quantity THO/DEC will be described later on.

Figure 10:
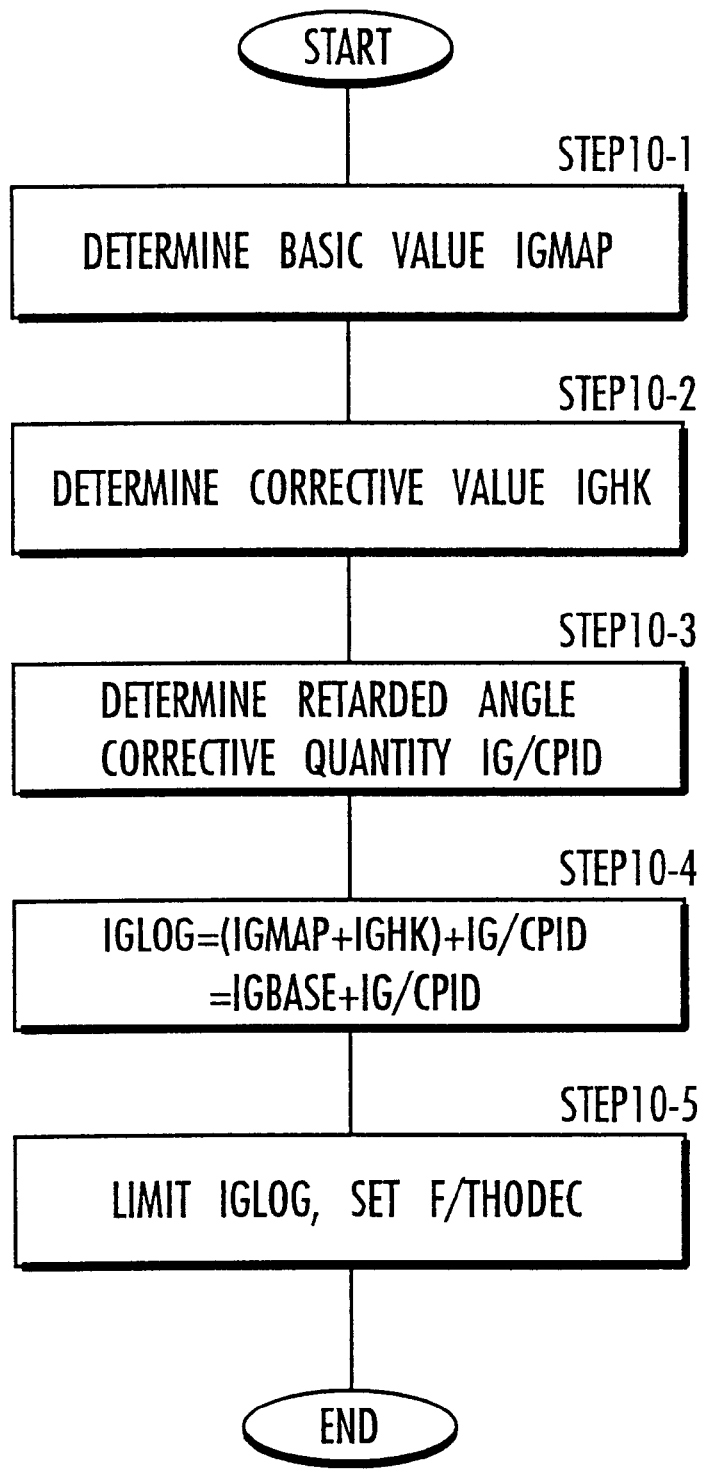
FIG. 10 is a flowchart of a subroutine of the control process of the control system shown in FIG. 1.
Figure 11:
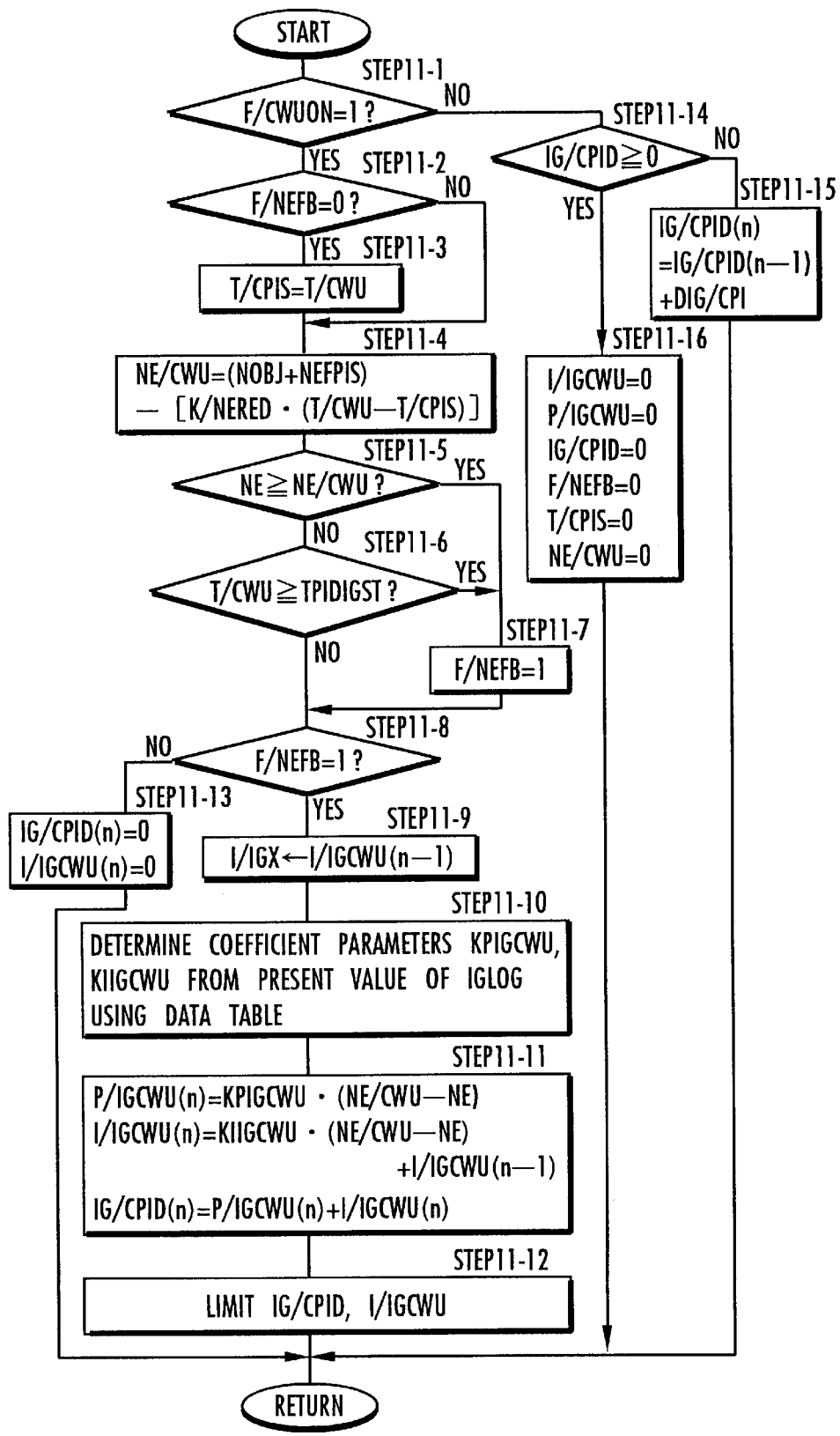
FIG. 11 is a flowchart of a subroutine of the control process of the control system shown in FIG. 1.

The process of calculating the command value IGLOG for the ignition timing of the internal combustion engine 1 in STEP3-6 shown in FIG. 3 is carried out by the target rotational speed setting means 14 and the ignition timing control means 15 of the controller 2 according to flowcharts shown in FIGS. 10 and 11.

As shown in FIG. 10, the ignition timing control means 15 determines a basic value IGMAP of the ignition timing in STEP10-1. The basic value IGMAP is determined from detected values of the rotational speed NE and the intake pressure PB of the internal combustion engine 1 using a predetermined map.

Then, the ignition timing control means 15 determines a corrective value IGHK for correcting the basic value IGMAP depending on detected values of the engine temperature TW and the atmospheric temperature TA, from those detected values using a map and a predetermined formula, in STEP10-2. The corrective value IGHK corrects the basic value IGMAP by being added to the basic value IGMAP. The ignition timing determined by the sum (IGMAP+IGHK) of the basic value IGMAP and the corrective value IGHK is the advanced ignition timing IGBASE (IGBASE=IGMAP+IGHK) indicated by the dot-and-dash-line curve in the middle diagram section of FIG. 2, and corresponds to the advanced ignition timing for properly operating the internal combustion engine 1 in the normal mode. The ignition timing IGBASE will hereinafter be referred to as a "normal ignition timing IGBASE".

Then, the ignition timing control means 15 calculates the retarded angle corrective quantity IG/CPID for correcting the normal ignition timing IGBASE in the CWU mode in STEP10-3.

FIG. 11 shows in detail a process of calculating the retarded angle corrective quantity IG/CPID in STEP10-3. As shown in FIG. 11, the ignition timing control means 15 determines the value of the CWU on/off flag F/CWUON in STEP11-1. If F/CWUON=1, i.e., if the operation mode of the control system is set to the CWU mode, then the ignition timing control means 15 determines the value of a flag F/NEFB (hereinafter referred to as a "retard correction on/off flag F/NEFB") in STEP11-2. The retard correction on/off flag F/NEFB is "1" if the ignition timing control rotational speed F/B control process, i.e., the process of determining the retarded angle corrective quantity IG/CPID according to the PI control process to control the ignition timing (basically, to retard the ignition timing) in order to converge the rotational speed NE of the internal combustion engine 1 to the target rotational speed NE/CWU, is to be carried out, and "0" is the ignition timing control rotational speed F/B control process is not to be carried out. The retard correction on/off flag F/NEFB is initialized to "0" in the start mode process (STEP3-2), and set to "1" in the processing of STEP11-5 through STEP11-7, described later on.

If F/NEFB=0 in STEP11-2, i.e., if the ignition timing control rotational speed F/B control process has not yet been started, then the value of a parameter T/CPIS for recognizing the time of starting the ignition timing control rotational speed F/B control process is set to the present CWU elapsed time T/CWU in STEP11-3. If F/NEFB=1 in STEP11-2, then the processing of STEP11-3 is skipped. Therefore, when the retard correction on/off flag F/NEFB changes from "0" to "1" (the time of starting the ignition timing control rotational speed F/B control process), the value of the parameter T/CPIS is fixedly set to the CWU elapsed time T/CWU at the time (more precisely, one control cycle ahead of the time).

Then, the ignition timing control means 15 causes the target rotational speed setting means 14 to calculate the target rotational speed NE/CWU of the internal combustion engine 1 in STEP11-4. The target rotational speed setting means 14 calculates the target rotational speed NE/CWU according to the following equation (1):

$$NE/CWU = NOBJ + NECPIS - [K/NERED \cdot (T/CWU - T/CPIS)] \quad (1)$$

In the equation (1), NOBJ represents a predetermined idling rotational speed NOBJ (a target rotational speed for the internal combustion engine 1 as it is idling) indicated in the lower diagram section of FIG. 2. The term (NOBJ+NECPIS) represents the preset rotational speed which is higher than the idling rotational speed NOBJ by the given value NECPIS. In the equation (1), (T/CWU–T/CPIS), i.e., the difference between the CWU elapsed time T/CWU and the value of the parameter T/CPIS, is "0" in the processing of STEP11-3 if the retard correction on/off flag F/NEFB is "0" (at this time, NE/CWU=NOBJ+NECPIS=preset rotational speed). After the time when the retard correction on/off flag F/NEFB changes from "0" to "1", the difference (T/CWU–T/CPIS) represents an elapsed time from the time (which is either the time when the rotational speed NE of the internal combustion engine 1 reaches the present rotational speed (NOBJ+NECPIS) or the time when the CWU elapsed time T/CWU reaches a predetermined value). In the equation (1), K/NERED represents a predetermined coefficient (>0) which defines the decremental rate (gradient) at which the target rotational speed NE/CWU decreases from the preset rotational speed (NOBJ+NECPIS) to the idling rotational speed NOBJ, as described above with reference to FIG. 2.

For determining the target rotational speed NE/CWU according to the equation (1), a lower limit for the target rotational speed NE/CWU is set to the idling rotational speed NOBJ. When the calculated result of the right-hand side of the equation (1) is smaller than the idling rotational speed NOBJ, then the target rotational speed NE/CWU is subsequently fixedly set to the idling rotational speed NOBJ.

After the target rotational speed NE/CWU is determined by the target rotational speed setting means 14, the ignition timing control means 15 compares the present detected value of the rotational speed NE of the internal combustion engine 1 and the target rotational speed NE/CWU with each other in STEP11-5. If NE<NE/CWU, then the ignition timing control means 15 determines whether the CWU elapsed time T/CWU reaches a predetermined value TPI- DIGST (T/CWU≧TPIDIGST) or not in STEP11-6. If T/CWU<TPIDIGST (at this time, NE<NE/CWU), then control goes to STEP11-8.

If NE≧NE/CWU in STEP11-5, i.e., if the rotational speed NE of the internal combustion engine 1 rises to the target rotational speed NE/CWU, or if T/CWU≧TPIDIGST in STEP11-6, i.e., if the CWU elapsed time T/CWU reaches the predetermined value TPIDIGST, then the ignition timing control means 15 sets the retard correction on/off flag F/NEFB to "1" in order to start the ignition timing control rotational speed F/B control process in STEP11-7, after which control goes to STEP11-8.

If the retard correction on/off flag F/NEFB is "0", then since the target rotational speed NE/CWU calculated in STEP11-4 is the preset rotational speed (NOBJ+NECPIS) as described above, the retard correction on/off flag F/NEFB changes from "0" to "1" at the time the rotational speed NE of the internal combustion engine 1 increases to the preset rotational speed (NOBJ+NECPIS). Even if the rotational speed NE of the internal combustion engine 1 does not increase to the preset rotational speed (NOBJ+NECPIS) due to the properties of the fuel used by the internal combustion engine 1, the retard correction on/off flag F/NEFB changes from "0" to "1" when the elapsed time after the start of the internal combustion engine 1, i.e., the CWU elapsed time T/CWU, reaches the predetermined value TPIDIGST.

After the value of the retard correction on/off flag F/NEFB changes, i.e., after the ignition timing control rotational speed F/B control process is to be carried out, the target rotational speed NE/CWU calculated in STEP11-4 gradually decreases from the preset rotational speed (NOBJ+NECPIS) to the idling rotational speed NOBJ at a predetermined decremental rate according to the equation (1). After the target rotational speed NE/CWU is reduced to the idling rotational speed NOBJ, the target rotational speed NE/CWU is maintained at the idling rotational speed NOBJ. This time-dependent changing pattern of the target rotational speed NE/CWU is indicated by the broken-line curve in the lower diagram section of FIG. 2.

In STEP11-8, the ignition timing control means 15 determines the present value of the retard correction on/off flag F/NEFB. If F/NEFB=1, i.e., if the ignition timing control rotational speed F/B control process is to be carried out, then the value of an integral term I/IGCWU(n−1) ("n" indicates the present control cycle and "n−1" indicates the preceding control cycle) calculated when the retarded angle corrective quantity IG/CPID is determined by the PI control process according to the ignition timing control rotational speed F/B control process in the preceding control cycle, is stored as the value of a parameter I/IGX in STEP11-9. The retarded angle corrective quantity IG/CPID and the integral term I/IGCWU are initialized to "0" in the start mode process (STEP3-2).

Figure 12:
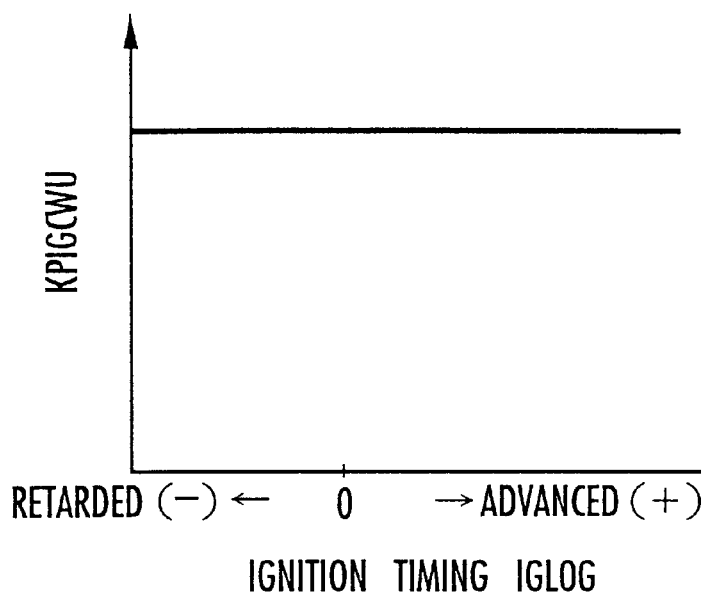
FIG. 12 is a diagram showing a data table used in the subroutine shown in FIG. 11.
Figure 13:
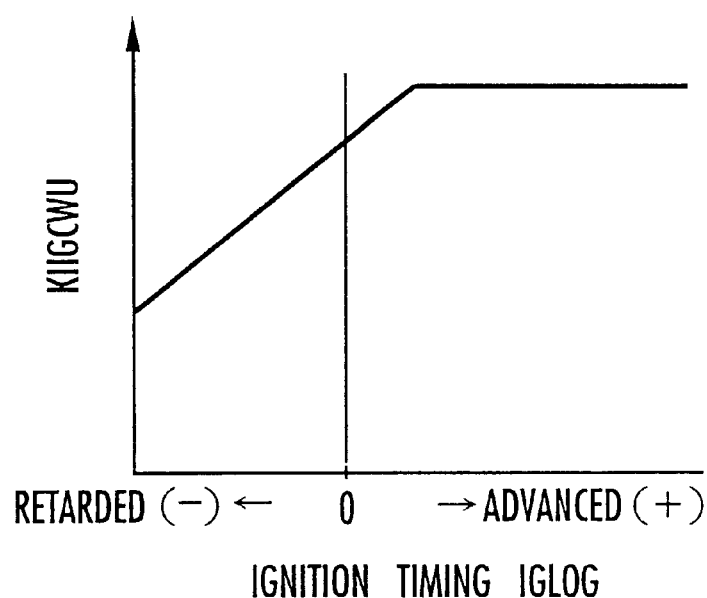
FIG. 13 is a diagram showing a data table used in the subroutine shown in FIG. 11.

Then, the ignition timing control means 15 determines a coefficient parameter (so-called proportional gain) KPIGCWU relative to a proportional term and a coefficient parameter (so-called integral gain) KIIGCWU relative to an integral term, for determining the retarded angle corrective quantity IG/CPID according to the PI control process, from the present value of the command value IGLOG for the ignition timing (the command value IGLOG determined in the preceding control cycle) using predetermined data tables shown in FIGS. 12 and 13, in STEP11-10.

In the data table shown in FIG. 12, the coefficient parameter KPIGCWU relative to the proportional term is constant irrespective of the command value IGLOG for the ignition-timing. In the data table shown in FIG. 13, the coefficient parameter KIIGCWU relative to the integral term is basically smaller as the command value IGLOG for the ignition timing is more retarded.

After determining the coefficient parameters KPIGCWU, KIIGCWU depending on the present value of the command value IGLOG for the ignition timing, the ignition timing control means 15 calculates a proportional term P/IGCWU(n) and an integral term I/IGCWU(n) for determining the retarded angle corrective quantity IG/CPID(n) in the present control cycle according to the PI control process, using the difference (NE/CWU−NE) between the present target rotational speed NE/CWU and the detected value of the rotational speed NE, and the coefficient parameters KPIGCWU, KIIGCWU determined in STEP11-10 according to the following equations (2), (3) in STEP11-11:

$$P/IGCWU(n) = KPIGCWU \cdot (NE/CWU - NE) \quad (2)$$

$$I/IGCWU(n) = KIIGCWU \cdot (NE/CWU - NE) + I/IGCWU(n-1) \quad (3)$$

In STEP11-1, the ignition timing control means 15 adds the proportional term P/IGCWU(n) and the integral term I/IGCWU(n) to each other, calculating the retarded angle corrective quantity IG/CPID(n) in the present control cycle according to the following equation (4):

$$IG/CPID(n) = P/IGCWU(n) + I/IGCWU(n) \quad (4)$$

The ignition timing control means 15 then limits, in STEP11-12, upper and lower limits of the retarded angle corrective quantity IG/CPID and the integral term I/IGCWU that have been determined in STEP11-11, after which the process of calculating the retarded angle corrective quantity IG/CPID in the present control cycle is finished. The limiting process in STEP11-12 is a process of forcibly limiting the retarded angle corrective quantity IG/CPID to a predetermined upper limit or a predetermined lower limit if the retarded angle corrective quantity IG/CPID has exceeded the upper limit or the lower limit. The limiting process in STEP11-12 also limits the integral term I/IGCWU in a similar manner.

If F/NEFB=0 in STEP11-8, i.e., if the ignition timing control rotational speed F/B control process is not to be carried out, then the ignition timing control means 15 sets the values of the retarded angle corrective quantity IG/CPID(n) and the integral term I/IGCWU(n) in the present control cycle to "0" in STEP11-13. Thereafter, the process of calculating the retarded angle corrective quantity IG/CPID in the present control cycle is finished.

The retarded angle corrective quantity IG/CPID thus calculated in STEP11-11 is added to the normal ignition timing IGBASE for thereby retarding the ignition timing. The retarded angle corrective quantity IG/CPID is basically of a negative value. Specifically, when the amount of intake air is increased by the intake air quantity control means 13, the rotational speed NE of the internal combustion engine 1 tends to rise from the idling rotational speed NOBJ. Therefore, the retarded angle corrective quantity IG/CPID determined according to the PI control process in order to converge the rotational speed NE of the internal combustion engine 1 to the target rotational speed NE/CWU, i.e., in order to eliminate the difference (NE/CWU−NE) retards the normal ignition timing IGBASE (makes the ignition timing negative) in order to prevent the rotational speed NE of the internal combustion engine 1 from increasing. In the CWU mode, therefore, the retarded angle corrective quantity IG/CPID is calculated in the pattern indicated by the broken-line curve in the middle diagram section of FIG. 2.

In FIG. 2, because the shift lever of the automatic transmission changes from the N (neutral) range to the D (drive)

range while in the CWU mode, the load on the internal combustion engine 1 slightly increases, and the rotational speed NE slightly drops from the idling rotational speed NOBJ. As a result, the magnitude (absolute value) of the retarded angle corrective quantity IG/CPID after the ranges of the automatic transmission are changed by the shift lever is smaller than before the ranges of the automatic transmission are changed by the shift lever.

In this embodiment, even if the rotational speed NE of the internal combustion engine 1 does not increase to the preset. rotational speed (NOBJ+NECPIS) due to the properties of the fuel used by the internal combustion engine 1, the ignition timing control rotational speed F/B control process is started and the retarded angle corrective quantity IG/CPID is calculated in STEP11-11 when the CWU elapsed time T/CWU reaches the predetermined value TPIDIGST. In this case, the retarded angle corrective quantity IG/CPID advances the ignition timing (IG/CPID>0). With the ignition timing thus advanced, the rotational speed NE of the internal combustion engine 1 can be increased toward the target rotational speed NE/CWU.

If the CWU on/off flag F/CWUON=0 (normal mode) in STEP11-1, then the ignition timing control means 15 determines whether or not the present retarded angle corrective quantity IG/CPID is equal to or greater than "0" in STEP11-14.

If the present retarded angle corrective quantity IG/CPID is not equal to or greater than "0" (IG/CPID<0), then the control system is basically in a situation immediately after its operation mode is changed from the CWU mode in which the retarded angle corrective quantity IG/CPID is calculated in STEP11-11 to the normal mode. Then, the ignition timing control means 15 calculates the retarded angle corrective quantity IG/CPID(n) in the present control cycle by adding a predetermined value DIG/CPI (>0) to the retarded angle corrective quantity IG/CPID(n−1) in the preceding control cycle in STEP11-15. That is, the retarded angle corrective quantity IG/CPID is advanced back by the predetermined value DIG/CPI in each control cycle.

At this time, the upper limit for the retarded angle corrective quantity IG/CPID is "0", and if the calculated sum of IG/CPID(n−1)+DIG/CPI is greater than "0", then the retarded angle corrective quantity IG/CPID(n) in the present control cycle is set to "0".

If IG/CPID≧0 in STEP11-14, i.e., if the operation mode of the control system changes to the normal mode without the calculation of the retarded angle corrective quantity IG/CPID in STEP11-11 or if the retarded angle corrective quantity IG/CPID is returned to "0" in STEP11-15 after the operation mode of the control system changes from the CWU mode to the normal mode, then the values of the integral term I/IGCWU, the proportional term P/IGCWU, the retarded angle corrective quantity IG/CPID, the retard correction on/off flag F/NEFB, the parameter T/CPIS, and the target rotational speed NE/CWU are initialized to "0" in STEP11-16.

Referring back to FIG. 10, after having calculated the retarded angle corrective quantity IG/CPID as described above, the ignition timing control means 15 adds the basic value IGMAP of the ignition timing determined in STEP10-1, the corrective value IGHK determined in STEP10-2, and the retarded angle corrective quantity IG/CPID determined in STEP10-3, i.e., adds the retarded angle corrective quantity IG/CPID to the normal ignition timing IGBASE (=IGMAP+IGHK)), thereby determining a command value IGLOG for the ignition timing in the present control cycle in STEP10-4.

The command value IGLOG for the ignition timing thus determined, more precisely the command value IGLOG for the ignition timing thus while the retard correction on/off flag F/NEFB is being set to "1", is determined in order to converge the rotational speed NE of the internal combustion engine 1 to the target rotational speed NE/CWU according to the ignition timing control rotational speed F/B control process which is the feedback control process based on the PI control principles.

Then, the ignition timing control means 15 limits the command value IGLOG for the ignition timing to a value within a given allowable range for normally operating the internal combustion engine 1 (including the ignition unit 10), and sets the increase correction flag F/THODEC, in a manner described below, to determine a final command value for the ignition timing in STEP10-5.

Figure 14:
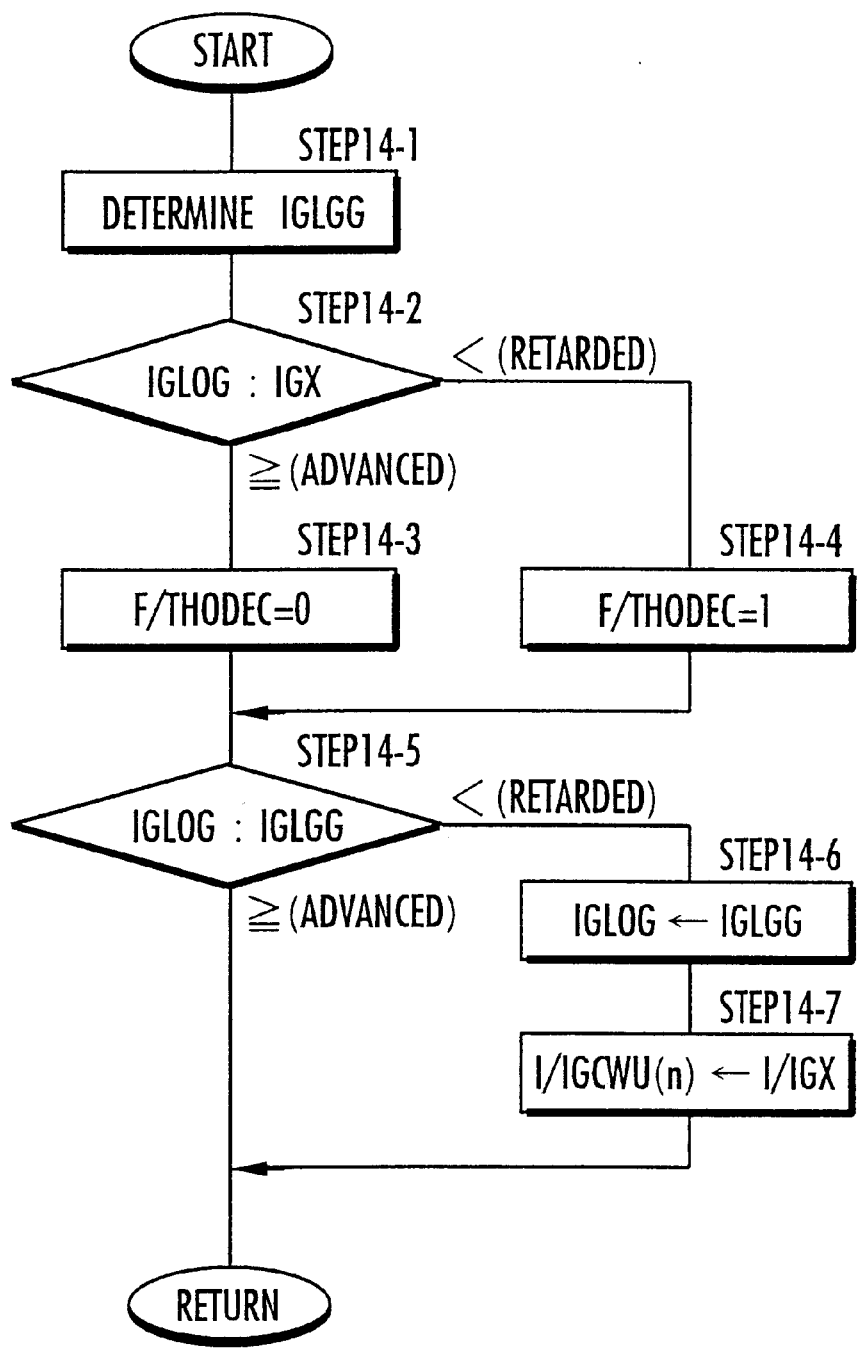
FIG. 14 is a flowchart of a subroutine of the control process of the control system shown in FIG. 1.

As shown in FIG. 14, the ignition timing control means 15 determines an allowable retarded limit IGLGG, which is a retarded limit of an allowable range in which the ignition timing can actually be manipulated, depending on the present engine temperature TW using a data table in STEP14-1.

Then, the ignition timing control means 15 compares the command value IGLOG for the ignition timing determined in STEP10-4 with a given threshold IGX (see FIG. 15) which is more advanced than the allowable retarded limit IGLGG by a certain amount, in STEP14-2. If IGLOG≧IGX, indicating that the command value IGLOG is more advanced than the threshold IGX (including IGLOG=IGX), then the ignition timing control means 15 sets the increase correction flag F/THODEC used in the decision processing of STEP6-3 (see FIG. 6) to "0" in STEP14-3. If IGLOG<IGX, indicating that the command value IGLOG is more retarded than the threshold IGX, then the ignition timing control means 15 sets the increase correction flag F/THODEC to "1" in STEP14-4.

Therefore, if the command value IGLOG for the ignition timing determined in STEP10-4 is more advanced than the threshold IGX in the present control cycle, then the throttle corrective quantity THO/DEC is kept at the preceding value in the process shown in FIG. 6 for determining the command value THO/CWU for the throttle valve opening in the CWU mode in the present control cycle. If the command value IGLOG for the ignition timing determined in STEP10-4 is more retarded than the threshold IGX in the present control cycle, then the throttle corrective quantity THO/DEC corrected to reduce the throttle valve opening by the unit corrective value d/THODEC in the process shown in FIG. 6 in a next control cycle.

After having thus set the increase correction flag F/THODEC, the ignition timing control means 15 compares the command value IGLOG for the ignition timing determined in STEP10-4 with the allowable retarded limit IGLGG determined in STEP14-1 in STEP14-5. If the command value IGLOG is more advanced than the allowable retarded limit IGLGG (IGLOG≧IGLGG), i.e., if the command value IGLOG is in the allowable range for the ignition timing, then the process shown in FIG. 4 is finished (the final command value IGLOG for the ignition timing is set to the value determined in STEP10-4).

If the command value IGLOG is more retarded than the allowable retarded limit IGLGG and hence deviates from the allowable range (IGLOG<IGLGG), then the ignition timing control means 15 forcibly limits the final command value IGLOG for the ignition timing to the allowable retarded limit IGLGG in STEP14-6. Then, the ignition timing control means 15 forcibly resets the present value I/IGCWU(n) of the integral term in the PI control process to the preceding value I/IGCWU(n−1) stored as the value of the parameter I/IGX in STEP11-9 in STEP14-7. The value of the integral term I/IGCWU in the PI control process is now kept at the present value (the value in the preceding control cycle) if the command value IGLOG for the ignition timing determined in STEP10-4 is more retarded than the allowable retarded limit IGLGG.

The controller 2 then supplies the final command value IGLOG for the ignition timing determined by the ignition timing control means 15 to the ignition unit 10, which then ignites the air-fuel mixture in the internal combustion engine 1 according to the supplied ignition timing IGLOG.

Based on the above ignition timing control, in the CWU mode, when the rotational speed NE reaches the preset rotational speed (NOBJ+NECPIS) or the CWU elapsed time T/CWU reaches the predetermined value TPIDIGST after the start of the internal combustion engine 1, the retarded angle corrective quantity IG/CPID for the ignition timing is determined according to the PI control process in order to converge the rotational speed NE to the target rotational speed NE/CWU (which is finally the idling rotational speed NOBJ) which is established as described above. Basically, the ignition timing of the internal combustion engine 1 is manipulated according to the command value IGLOG for the ignition timing which is produced by correcting the normal ignition timing IGBASE with the retarded angle corrective quantity IG/CPID. Stated otherwise, the ignition timing of the internal combustion engine 1 is manipulated according to the feedback control process based on the PI control principles (the ignition timing control rotational speed F/B control process) in order to converge the rotational speed NE of the internal combustion engine 1 to the target rotational speed NE/CWU (finally to the idling rotational speed NOBJ).

At this time, the amount of intake air introduced into the internal combustion engine 1 has been made greater than in the normal idling mode, according to the command value THO/CWU for the throttle valve opening determined in the feed-forward control process as described above, so that the rotational speed NE of the internal combustion engine 1 tends to rise from the idling rotational speed NOBJ. As a consequence, the retarded angle corrective quantity IG/CPID becomes a corrective quantity for regarding the ignition timing (IG/CPID<0) as indicated by the broken-line curve in the middle diagram section of FIG. 2. The ignition timing IGLOG is thus manipulated so as to be retarded as indicated by the solid-line curve in the middle diagram section of FIG. 2.

If the operation mode of the control system changes from the CWU mode to the normal mode (the CWU is canceled) as when the accelerator pedal is pressed while the internal combustion engine 1 is operated in the CWU mode, then the magnitude (absolute value) of the retarded angle corrective quantity IG/CPID determined in the CWU mode is gradually reduced finally to "0" (the processing of STEP11-15) as indicated in the right-hand area of the middle diagram section of FIG. 2. Consequently, the ignition timing IGLOG returns gradually to the advanced normal ignition timing IGBASE after the CWU mode is canceled.

According to the operation of the control system as described above, since the amount of intake air introduced into the internal combustion engine 1 is increased and the ignition timing of the internal combustion engine 1 is retarded in the CWU mode after the start of the internal combustion engine 1, the amount of heat generated by the internal combustion engine 1, i.e., by the combustion of the air-fuel mixture, and hence the amount of heat contained in the exhaust gases are made greater than when the internal combustion engine 1 is idling normally. As a result, the temperature of the catalytic converter 3 quickly increases, quickly activating the catalytic converter 3. Thus, the desired purifying capability of the catalytic converter 3 after the start of the internal combustion engine 1 can be achieved at an early stage, and the exhaust emission capability of the internal combustion engine 1 can be improved.

While the amount of intake air introduced into the internal combustion engine 1 is increasing, the retarded angle corrective quantity IG/CPID is generated according to the feedback control process based on the PI control principles (the ignition timing control rotational speed F/B control process) in order to converge the rotational speed NE of the internal combustion engine 1 to the target rotational speed NE/CWU (finally to the idling rotational speed NOBJ), and the ignition timing is corrected so as to be retarded by the retarded angle corrective quantity IG/CPID. In this manner, the rotational speed NE of the internal combustion engine 1 can be maintained at an appropriate level (basically, the idling rotational speed NOBJ).

For manipulating the ignition timing in the CWU mode, the ignition timing control rotational speed F/B control process is started after the rotational speed NE of the internal combustion engine 1 is increased to the preset rotational speed (NOBJ+NECPIS) which is higher than the idling rotational speed NOBJ that is the final target value for the rotational speed NE of the internal combustion engine 1. Rather than setting the target rotational speed NE/CWU to the idling rotational speed NOBJ immediately after the start of the ignition timing control rotational speed F/B control process, the target rotational speed NE/CWU is gradually reduced from the preset rotational speed (NOBJ+NECPIS) to the idling rotational speed NOBJ. In this fashion, the ignition timing is prevented from being abruptly retarded in an initial stage after the start of the ignition timing control rotational speed F/B control process, but the rotational speed NE of the internal combustion engine 1 can be converged to the idling rotational speed NOBJ while stabilizing the operation of the internal combustion engine 1.

In the ignition timing control rotational speed F/B control process, the value of the coefficient parameter KIIGCWU relative to the integral term I/IGCWU for determining the retarded angle corrective quantity IG/CPID according to the PI control process is established depending on the present value of the command value IGLOG for the ignition timing, i.e., the ignition timing which is being presently manipulated, using the data table shown in FIG. 13. As a result, the feedback gain of the ignition timing control rotational speed F/B control process is smaller as the ignition timing being manipulated is more retarded, and greater as the ignition timing being manipulated is more advanced.

Therefore, with the ignition timing being retarded relatively largely (the rate of a change of the rotational speed NE to a change of the ignition timing is relatively large), the change in the retarded angle corrective quantity IG/CPID calculated according to the equations (2)–(4) when the difference (NE−NE/CWU) between the rotational speed NE and the target rotational speed NE/CWU is changed is held to a relatively small value. Thus, the rotational speed NE of the internal combustion engine 1 is prevented from being excessively varied, but can stably be converged to the target rotational speed NE/CWU.

Conversely, with the ignition timing being advanced (the rate of a change of the rotational speed NE to a change of the ignition timing is relatively small), the change in the retarded angle corrective quantity IG/CPID calculated when the difference (NE−NE/CWU) between the rotational speed NE and the target rotational speed NE/CWU is changed is of a value sufficient for converging the rotational speed NE to the target rotational speed NE/CWU. Thus, the rotational speed NE of the internal combustion engine 1 can quickly be converged to the target rotational speed NE/CWU.

In this embodiment, for increasing the amount of intake air introduced into the internal combustion engine 1, the basic value THO/CTBL (see FIG. 7) for the throttle valve opening is established depending on the engine temperature TW at the start of the internal combustion engine 1, which is indicative of the temperature of the catalytic converter 3 at the start of the internal combustion engine 1. Therefore, the amount of heat generated by the internal combustion engine 1 is made suitable for the temperature of the catalytic converter 3 at the start of the internal combustion engine 1, so that the temperature of the catalytic converter 3 can appropriately be increased and the catalytic converter 3 can appropriately be activated.

In an initial stage of increasing the amount of intake air introduced into the internal combustion engine 1 (immediately after the start of the internal combustion engine 1), the throttle valve opening and hence the amount of intake air are increased according to the pattern of time-dependent changes between the times 0–t1 of the basic value corrective coefficient KM/CWU shown in FIG. 9 for thereby smoothly stabilizing the combustion of the air-fuel mixture in the internal combustion engine 1 immediately after it starts to operate.

Upon elapse of a certain time after the amount of intake air starts increasing (at the time t2 in FIG. 9), the throttle valve opening defining the basic increase for the amount of intake air, more specifically the basic throttle valve opening (=THO/CWU·KM/CWU) determined by the basic value THO/CWU and the basic value corrective coefficient KM/CWU, is gradually reduced with time in the pattern of the time table shown in FIG. 9. Basically, therefore, it is possible to prevent the rotational speed NE from tending to rise due to a reduction in the friction of various components of the internal combustion engine 1 as the internal combustion engine 1 becomes warmer, without having to retard the ignition timing more than necessary.

Figure 15:
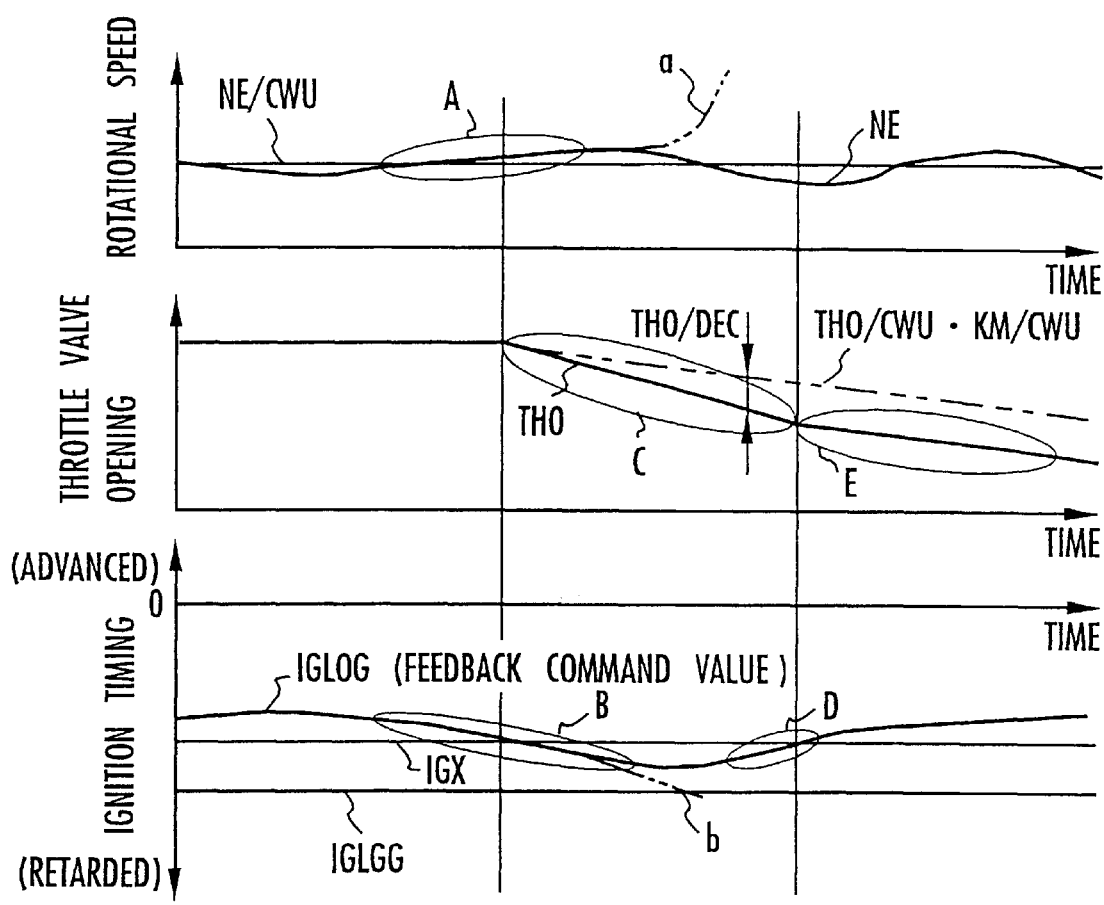
FIG. 15 is a diagram illustrative of an operation of the control system shown in FIG. 1.

While the ignition timing is feedback-controlled to converge the rotational speed NE of the internal combustion engine 1 to the target rotational speed NE/CWU according to the PI control process (with the retard correction on/off flag F/NEFB being set to "1"), if the command value IGLOG for the ignition timing determined in STEP10-4 is more retarded than the threshold IGX, then the throttle valve opening THO is reduced from the basic throttle valve opening (=THO/CWU·KM/CWU) determined from the basic value THO/CWU and the basic value corrective coefficient KM/CWU, thus reducing the increase in the amount of intake air. This offers advantages which will be described below with reference to FIG. 15. It is assumed that the command value IGLOG for the ignition timing determined in STEP10-4 while the retard correction on/off flag F/NEFB is being set to "1" is referred to as a "feedback command value IGLOG". FIG. 15 shows time-dependent changes in the rotational speed NE (actual rotational speed) of the internal combustion engine 1, the throttle valve opening THO, and the feedback command value IGLOG for the ignition timing by solid-line curves respectively in upper, middle, and lower diagram sections.

The manner in which the friction of various components is lowered as the internal combustion engine 1 becomes warmer is affected by not only the engine temperature TW, but also various factors including the amount of the lubricant, the lubricant temperature, etc. Therefore, after the internal combustion engine 1 starts to operate, the friction may be lowered more quickly than expected or the friction may be lowered to more largely than expected. In such a case, if the throttle valve opening THO is controlled only by the basic throttle valve opening (=THO/CWU·KM/CWU) determined from the basic value THO/CWU and the basic value corrective coefficient KM/CWU, the rotational speed NE of the internal combustion engine 1 tends to rise from the target rotational speed NE/CWU, as indicated in an area A in the upper diagram section of FIG. 15, and the feedback command value IGLOG for the ignition timing approaches the allowable retarded limit IGLGG, as indicated in an area B in the lower diagram section of FIG. 15. If the increasing tendency of the rotational speed NE continues as indicated by the imaginary line "a" in upper diagram section of FIG. 15, the feedback command value IGLOG for the ignition timing eventually becomes more retarded than the allowable retarded limit IGLGG, as indicated by the imaginary line "b" in lower diagram section of FIG. 15. If the feedback command value IGLOG for the ignition timing, i.e., the command value IGLOG for the ignition timing determined in order to converge the rotational speed NE of the internal combustion engine 1 to the target rotational speed NE/CWU, is more retarded than the allowable retarded limit IGLGG, then the ignition timing which the controller 2 actually supplies to the ignition unit 10 is limited to the allowable retarded limit IGLGG, as described above. In such a situation, however, the increasing tendency of the rotational speed NE cannot be suppressed, and the rotational speed NE will increase greatly from the target rotational speed NE/CWU, as indicated by the imaginary line "a" in the upper diagram section of FIG. 15.

According to the illustrated embodiment, however, if the feedback command value IGLOG for the ignition timing becomes more retarded than the threshold IGX which is slightly more advanced than the allowable retarded limit IGLGG, then as long as such a situation continues, the throttle valve opening THO is reduced from the basic throttle valve opening (THO/CWU·KM/CWU) based on the basic value THO/CWU and the basic value corrective coefficient KM/CWU, by the unit corrective value d/THODEC in each control cycle (see an area C in the middle diagram section of FIG. 15). Stated otherwise, the increase in the amount of intake air determined by the basic value THO/CWU and the basic value corrective coefficient KM/CWU is corrected so as to be reduced by an amount corresponding to the unit corrective value d/THODEC for the throttle valve opening. In this case, since the unit corrective value d/THODEC for the throttle valve opening is established depending on the engine temperature TW (the warmed state of the internal combustion engine 1) at the time the internal combustion engine 1 starts to operate, the increase in the amount of intake air can be reduced in a manner to match the reduction in the friction in the internal combustion engine 1.

When the increase in the amount of intake air is thus reduced, the increasing tendency of the rotational speed NE is suppressed. As a result, after the feedback command value IGLOG for the ignition timing becomes more retarded than the threshold IGX, the feedback command value IGLOG is prevented from changing to a more retarded value. Therefore, the feedback command value IGLOG for the ignition timing is basically advanced back without being retarded to the allowable retarded limit IGLGG, as indicated in an area D in the lower diagram section of FIG. 15.

Inasmuch as the throttle valve opening THO which defines the increase in the amount of intake air is gradually reduced from the basic throttle valve opening (THO/CWU·KM/CWU) based on the basic value THO/CWU and the basic value corrective coefficient KM/CWU, by the unit corrective value d/THODEC, the increase in the amount of intake air is also gradually reduced. Thus, the command value IGLOG for the ignition timing determined to converge the rotational speed NE to the target rotational speed NE/CWU is prevented from changing abruptly.

Accordingly, the feedback command value IGLOG for the ignition timing which is determined in order to converge the rotational speed NE of the internal combustion engine 1 to the target rotational speed NE/CWU basically remains more advanced than the allowable retarded limit IGLGG, and does not change abruptly. As a result, the ignition unit 10 can be operated without fail according to the feedback command value IGLOG to converge the rotational speed NE of the internal combustion engine 1 stably to the target rotational speed NE/CWU.

In this embodiment, when the feedback command value IGLOG for the ignition timing reaches the threshold IGX as it returns from a value more retarded than the threshold IGX to an advanced value, the throttle corrective quantity THO/DEC (which is of a value produced by integrating the unit corrective value d/THODEC in each control cycle while the feedback command value IGLOG for the ignition timing is returning from the value more retarded than the threshold IGX to the threshold IGX) is held to the present value (determined in the preceding control cycle). After the feedback command value IGLOG for the ignition timing reaches the threshold IGX as it returns to the advanced value, the throttle corrective quantity THO/DEC for the basic throttle valve opening (THO/CWU·KM/CWU) is held to a constant value without further increasing, unless the command value IGLOG for the ignition timing changes to a value more retarded than the threshold IGX (see an area E in the middle diagram section of FIG. 15).

Consequently, the increase in the amount of intake air is prevented from being reduced unnecessarily to reduce the amount of heat generated by the internal combustion engine 1, and the activation of the catalytic converter 3 is prevented from being delayed.

Figure 16:
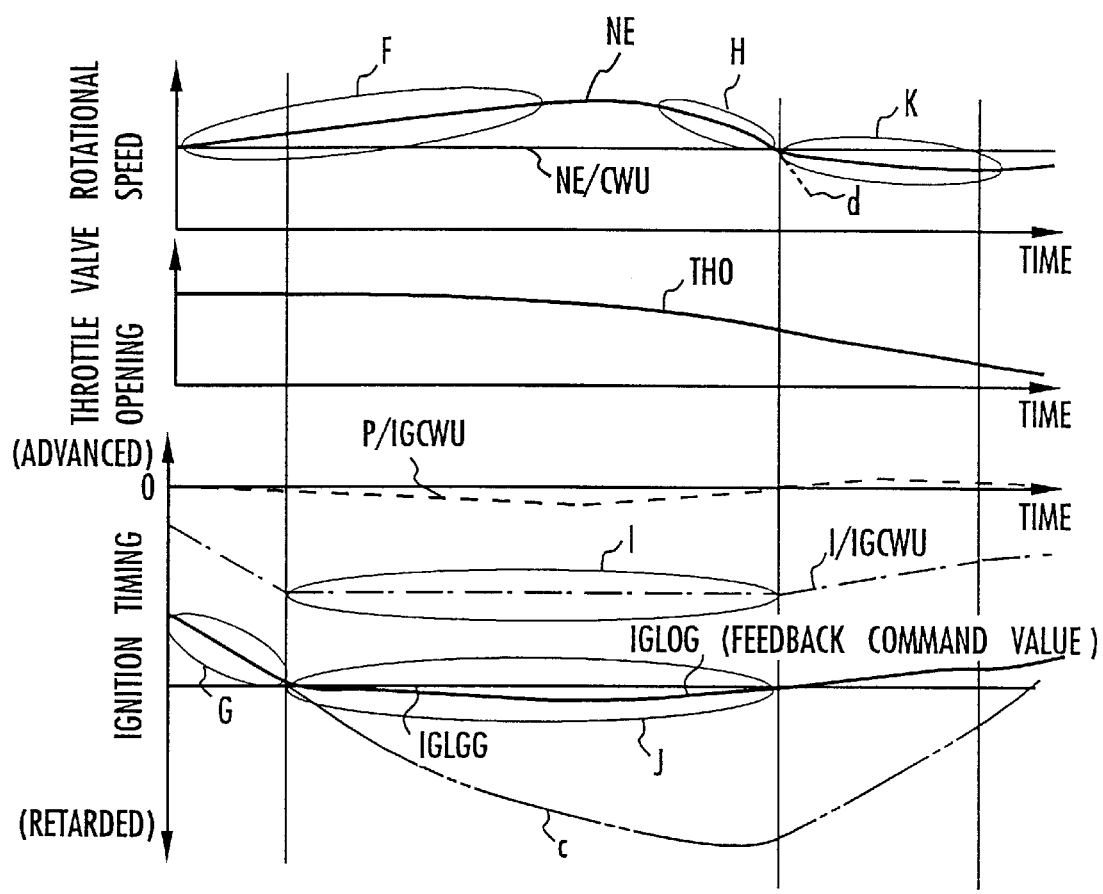
FIG. 16 is a diagram illustrative of an operation of the control system shown in FIG. 1.

In this embodiment, if the feedback command value IGLOG for the ignition timing changes to a retarded value beyond the allowable retarded limit IGLGG due to an abrupt reduction in the load on the internal combustion engine 1, for example, then the value of the integral term I/IGCWU in the PI control process is maintained to offer the advantages which will be described below with reference to FIG. 16. FIG. 16 shows time-dependent changes in the rotational speed NE (actual rotational speed) of the internal combustion engine 1, the throttle valve opening THO, and the feedback command value IGLOG for the ignition timing by solid-line curves respectively in upper, middle, and lower diagram sections.

When the load on the internal combustion engine 1 is abruptly reduced, e.g., when the automatic transmission coupled to the internal combustion engine 1 changes from the D range to the N range while the friction in the internal combustion engine 1 is being reduced relatively largely, the rotational speed NE tends to rise largely as indicated in an area F in the upper diagram section of FIG. 16. In this case, the increasing tendency of the rotational speed NE cannot immediately be suppressed by reducing the increase in the amount of intake air. As a result, the feedback command value IGLOG for the ignition timing abruptly changes to a retarded value beyond the allowable retarded limit IGLGG as indicated in an area G in the lower diagram section of FIG. 16.

If the integral term I/IGCWU is continuously calculated and updated in the PI control process even after the feedback command value IGLOG changes to a retarded value beyond the allowable retarded limit IGLGG, then since the integral term I/IGCWU represents the integral of the difference (NE−NE/CWU) between the rotational speed NE and the target rotational speed NE/CWU with respect to time, the value of the integral term I/IGCWU increases. Therefore, the feedback command value IGLOG that is determined using the value of the integral term I/IGCWU is of a value more retarded than the allowable retarded limit IGLGG, as indicated by the imaginary line "c" in the lower diagram section of FIG. 16. Therefore, the increasing tendency of the rotational speed NE is thereafter suppressed as the throttle valve opening THO is reduced (see the middle diagram section of FIG. 16), and even when the rotational speed NE then tends to decrease, as indicated by an area H in the upper diagram section of FIG. 16, it takes a certain time for the feedback command value IGLOG to return to a value more advanced than the allowable retarded limit IGLGG, as indicated by the imaginary line "c" in the lower diagram section of FIG. 16. As a result, the decreasing tendency of the rotational speed NE cannot quickly be suppressed, and the rotational speed NE is liable to drop greatly from the target rotational speed NE/CWU, as indicated by the imaginary line "d" in the upper diagram section of FIG. 16.

In the present embodiment, however, when the feedback command value IGLOG goes to a retarded value beyond the allowable retarded limit IGLGG, the integral term I/IGCWU is held to the value at this time, as indicated in an area I by the dot-and-dash-line curve in the lower diagram section of FIG. 16. Therefore, the feedback command value IGLOG changes, as indicated in an area J in the lower diagram section of FIG. 16, according to only the proportional term P/IGCWU (see the broken-line curve in the lower diagram section of FIG. 16) that is proportional to the difference (NE−NE/CWU) between the rotational speed NE and the target rotational speed NE/CWU in each control cycle (in the area J, the actual ignition timing of the internal combustion engine 1 is limited to the allowable retarded limit IGLGG). Therefore, the feedback command value IGLOG does not change to a value much more retarded than the allowable retarded limit IGLGG. Therefore, when the increasing tendency of the rotational speed NE is thereafter suppressed as the throttle valve opening THO is reduced (see the middle diagram section of FIG. 16), and when the rotational speed NE then tends to decrease, as indicated in the area H in the upper diagram section of FIG. 16, the feedback command value IGLOG returns quickly to a value more advanced than the allowable retarded limit IGLGG, as indicated in the area J in the lower diagram section of FIG. 16. As a result, the actual ignition timing of the internal combustion engine 1 can be controlled according to the feedback command value IGLOG which is more advanced than the allowable retarded limit IGLGG. Consequently, the decreasing tendency of the rotational speed NE can quickly be suppressed, allowing the rotational speed NE to converge to the target rotational speed NE/CWU, as indicated in an area K in the upper diagram section of FIG. 16.

The control system according to the illustrated embodiment cancels the CWU mode or does not operate in the CWU mode if the internal combustion engine 1 is to drive a load, such as for propelling the vehicle or energizing the air-conditioning unit, or if the rotational speed NE or the engine temperature TW of the internal combustion engine 1 is too high or low, or if the period of time for which the internal combustion engine 1 operates in the CWU mode exceeds the predetermined limit time TCWULMT. Therefore, the internal combustion engine 1 can have a desired ability to drive a load, and an excessive load is prevented from being posed on the internal combustion engine 1 and the catalytic converter 3.

When the CWU mode is canceled, the process of increasing the amount of intake air introduced into the internal combustion engine 1 is immediately canceled, the throttle valve opening is made depending on the manipulated quantity of the accelerator pedal, and the ignition timing is gradually returned to its original advanced value. Therefore, the vehicle can start to be propelled, i.e., the load can start to be driven by the internal combustion engine 1, by smooth operation of the internal combustion engine 1 depending on the manipulation of the accelerator pedal.

The ignition timing is manipulated in the CWU mode by increasing the amount of intake air and correcting the ignition timing to converge the rotational speed NE, which is achieved as a result of the increased amount of intake air, of the internal combustion engine 1 to the target rotational speed NE/CWU. As a result, the ignition timing is manipulated into an advanced value by the retarded angle corrective quantity IG/CPID matching the amount of intake air without being affected by a delay in the change in the amount of intake air due to the control of the throttle valve opening.

Consequently, the process of increasing the amount of intake air to quickly activate the catalytic converter 3 and the manipulation of the ignition timing can be performed independently of each other. Particularly, the manipulation of the ignition timing can be performed according to the feedback control process based on only the rotational speed NE of the internal combustion engine 1. Accordingly, the control system may be rendered simple while achieving required controllability.

In the embodiment described above, the retarded angle corrective quantity IG/CPID for the ignition timing for converging the rotational speed NE of the internal combustion engine 1 to the target rotational speed NE/CWU is determined according to the PI control process. However, the retarded angle corrective quantity IG/CPID may be determined according to a PID (proportional plus integral plus derivative) control process which takes into account a derivative term as well as a proportional term and an integral term.

In the above embodiment, only the coefficient parameter KIIGCWU of the integral term in the PI control process is varied depending on the command value IGLOG for the ignition timing in order to variably set up the feedback gain of the ignition timing control rotational speed F/B control process. However, the feedback gain of the ignition timing control rotational speed F/B control process may variably be established by varying the coefficient parameter KPIGCWU of the proportional term or the coefficient parameters KPIGCWU, KIIGCWU of both the proportional and integral terms dependent on the command value IGLOG for the ignition timing. If the retarded angle corrective quantity IG/CPID is determined according to the PID control process, then the feedback grain may variably be established by also varying the coefficient parameter relative to the derivative term dependent on the command value IGLOG for the ignition timing. At any rate, those coefficient parameters may specifically be established by way of experimentation and simulation in such a tendency that the feedback gain is smaller as the ignition timing is more retarded, in view of the stability and quick response of the control process for converging the rotational speed NE of the internal combustion engine 1 to the target rotational speed NE/CWU.

In this embodiment, the amount of intake air is controlled by the throttle valve actuator 12. However, the throttle valve may be linked to the ordinary accelerator pedal, and the amount of intake air may be controlled by controlling the rate of an air flow through the bypass passage. In this case, a flow control valve for controlling the rate of an air flow through the bypass passage may have flow rate characteristics capable of achieving the amount of intake air that is necessary in the present invention. The opening of the flow control valve for increasing the amount of intake air may be established in the same manner as with the throttle valve opening THO as described in the above embodiment.

Although a certain preferred embodiment of the present invention has been shown and described in detail, it should be understood that various changes and modifications may be made therein without departing from the scope of the appended claims.

What is claimed is:

1. An apparatus for controlling an internal combustion engine which emits exhaust gases through a catalytic converter, comprising:

intake air quantity control means for increasing an amount of intake air introduced into the internal combustion engine when the internal combustion engine is idling after the internal combustion engine starts to operate, to a level greater than when the internal combustion engine is idling normally; and ignition timing control means for generating a command value for ignition timing of the internal combustion engine according to a feedback control process in order to converge a rotational speed of the internal combustion engine to a predetermined target rotational speed after the amount of intake air introduced into the internal combustion engine starts being increased, and manipulating the ignition timing of the internal combustion engine based on the generated command value for ignition timing;

said ignition timing control means comprising means for variably establishing a feedback gain of said feedback control process depending on the ignition timing manipulated by said ignition timing control means.

2. An apparatus according to claim 1, wherein said means for variably establishing a feedback gain comprises means for establishing the feedback gain such that the feedback gain is smaller as the ignition timing is more retarded.

3. An apparatus according to claim 1 or 2, wherein said feedback control process comprises a proportional plus integral control process, and said means for variably establishing a feedback gain comprises means for varying the value of at least one of a coefficient parameter of a proportional term which is proportional to the difference between an actual rotational speed of the internal combustion engine and said target rotational speed, and a coefficient parameter of an integral term proportional to an integral of said difference, for thereby variably establishing said feedback gain.

4. An apparatus according to claim 1 or 2, further comprising:

target-rotational-speed setting means for setting said target rotational speed by varying said target rotational speed from a preset rotational speed to an idling rotational speed after the rotational speed of the internal combustion engine has reached said preset rotational speed which is higher than said idling rotational speed after the amount of intake air introduced into the internal combustion engine has started being increased by said intake air quantity control means.

5. An apparatus according to claim 1 or 2, wherein said intake air quantity control means comprises means for determining an increase in the amount of intake air introduced into the internal combustion engine while the internal combustion engine is idling normally, depending on the temperature of the catalytic converter when the internal combustion engine starts to operate, according to a feed-forward control process, and manipulating the amount of intake air introduced into the internal combustion engine according to the determined increase.

6. An apparatus according to claim 5, wherein said intake air quantity control means comprises means for determining said increase in order to gradually increase said increase with time immediately after the amount of intake air introduced into the internal combustion engine has started being increased.

7. An apparatus according to claim 5, wherein said intake air quantity control means comprises means for determining said increase in order to gradually reduce said increase with time upon elapse of a predetermined time after the amount of intake air introduced into the internal combustion engine has started being increased.

8. An apparatus according to claim 5, wherein said intake air quantity control means comprises means for correcting said increase so as to reduce said amount of intake air when the command value for the ignition timing generated by said ignition timing control means according to the feedback control process is more retarded than a predetermined threshold which is more retarded than the ignition timing within a predetermined allowable range for the ignition timing in which said internal combustion engine is capable of operating normally.

* * * * *